United States Patent
Patel et al.

(10) Patent No.: US 11,962,881 B1
(45) Date of Patent: Apr. 16, 2024

(54) VARIABLE POLYIMIDE THICKNESS TO CONTROL PAD IMPEDANCE

(71) Applicant: Apple Inc., Cupertino, CA (US)

(72) Inventors: Himesh Patel, Fremont, CA (US); Kai Min, San Jose, CA (US); Phillip R. Sommer, Newark, CA (US); Pavle Stojanovic, Mountain View, CA (US); Qiang Yang, Fremont, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 17/718,210

(22) Filed: Apr. 11, 2022

(51) Int. Cl.
  *H04N 23/54* (2023.01)
  *H04N 23/60* (2023.01)

(52) U.S. Cl.
  CPC ............ *H04N 23/54* (2023.01); *H04N 23/665* (2023.01)

(58) Field of Classification Search
  CPC .......................... H04N 23/54; H04N 23/665
  See application file for complete search history.

(56) References Cited

U.S. PATENT DOCUMENTS

| | | | |
|---|---|---|---|
| 8,536,667 B2 | 9/2013 | de Graff et al. | |
| 9,134,464 B2 | 9/2015 | Feng et al. | |
| 9,871,160 B2 | 1/2018 | Tian et al. | |
| 2017/0353640 A1* | 12/2017 | Wang | H04N 23/45 |

* cited by examiner

*Primary Examiner* — Twyler L Haskins
*Assistant Examiner* — Fayez A Bhuiyan
(74) *Attorney, Agent, or Firm* — Robert C. Kowert; Kowert, Hood, Munyon, Rankin & Goetzel, P.C.

(57) ABSTRACT

Various embodiments include sensor shift flexure arrangements for improved signal routing. For example, a camera with sensor shift actuation may include a flexure for suspending an image sensor from a stationary structure of the camera, and for allowing motion of the image sensor enabled by one or more actuators of the camera. The flexure may be configured to convey electrical signals between the image sensor and a flex circuit in some embodiments. According to some embodiments, the flexure may include a stack of layers comprising a conductive layer and an electrical grounding. The conductive layer may include a signal pad region and a signal trace region. A distance between at least one section of the signal pad region and the electrical grounding may be greater than a distance between at least a section of the signal trace region and the electrical grounding.

20 Claims, 16 Drawing Sheets

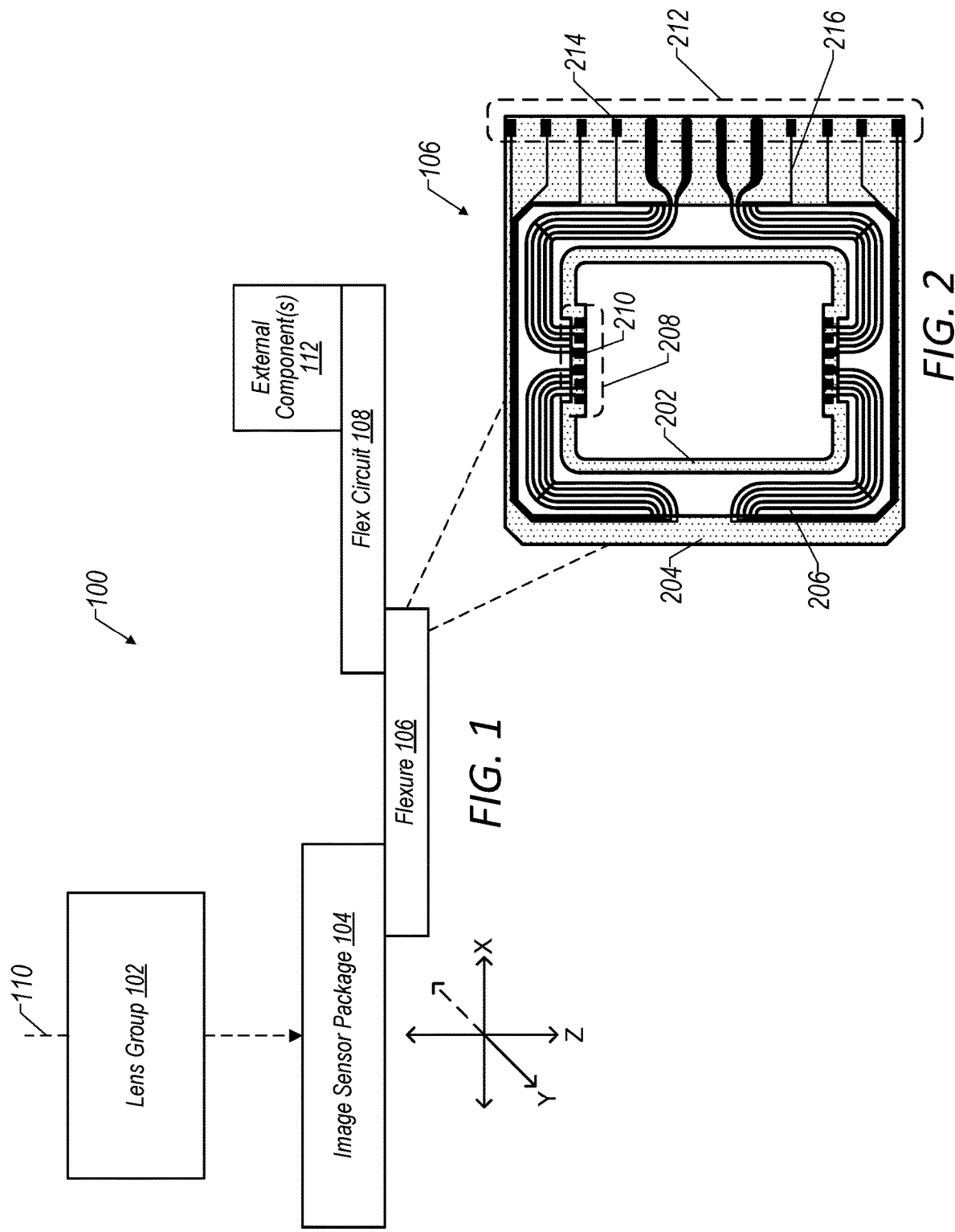

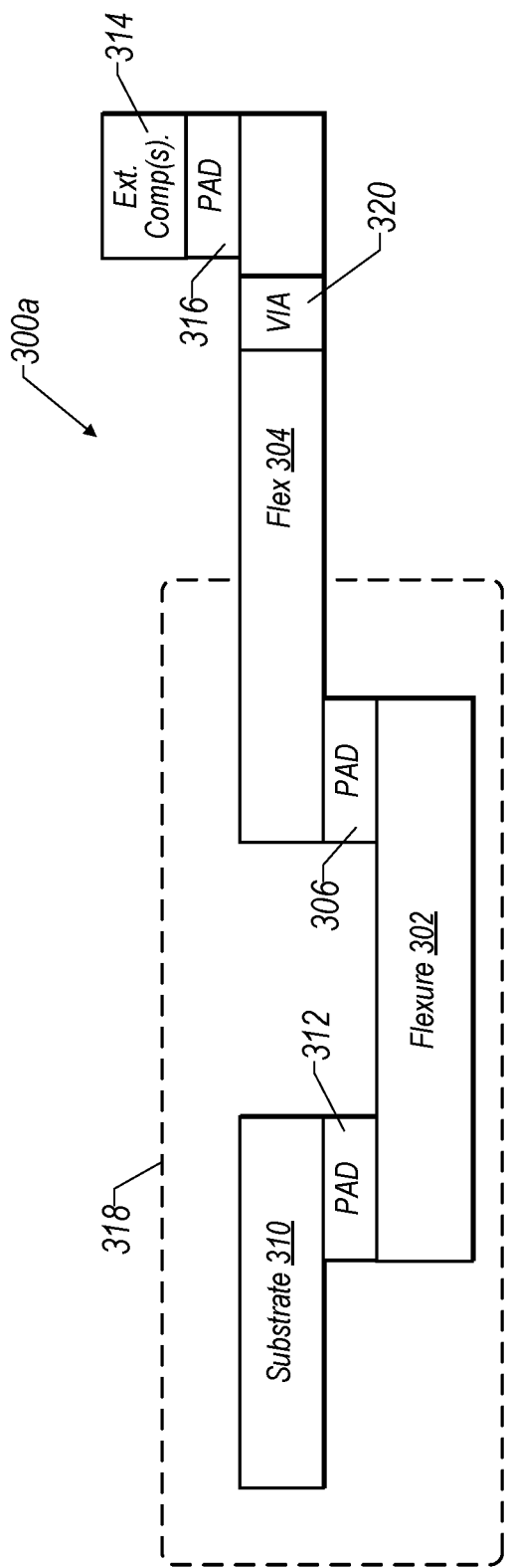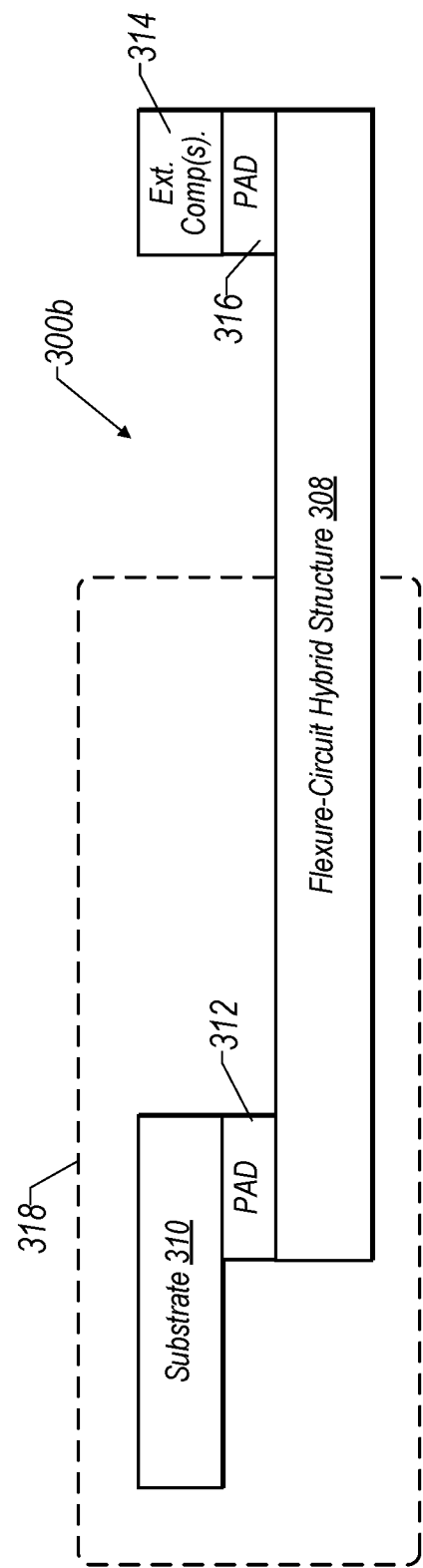

VARIABLE POLYIMIDE THICKNESS TO CONTROL PAD IMPEDANCE

BACKGROUND

Technical Field

This disclosure relates generally to sensor shift flexure arrangements for improved signal routing.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIG. 1 illustrates a schematic block diagram of an example camera system that may include a sensor shift flexure arrangement for improved signal routing according to some aspects.

FIG. 2 illustrates a top view of example sensor shift flexure that may include a sensor shift flexure arrangement for improved signal routing according to some aspects.

FIG. 3A illustrates schematic block diagram of an example camera having a sensor shift flexure arrangement including a flexure bonded to a flex circuit for improved signal routing according to some aspects.

FIG. 3B illustrates schematic block diagram of an example camera having a sensor shift flexure arrangement including a flexure-circuit hybrid structure for improved signal routing according to some aspects.

Figure 4:
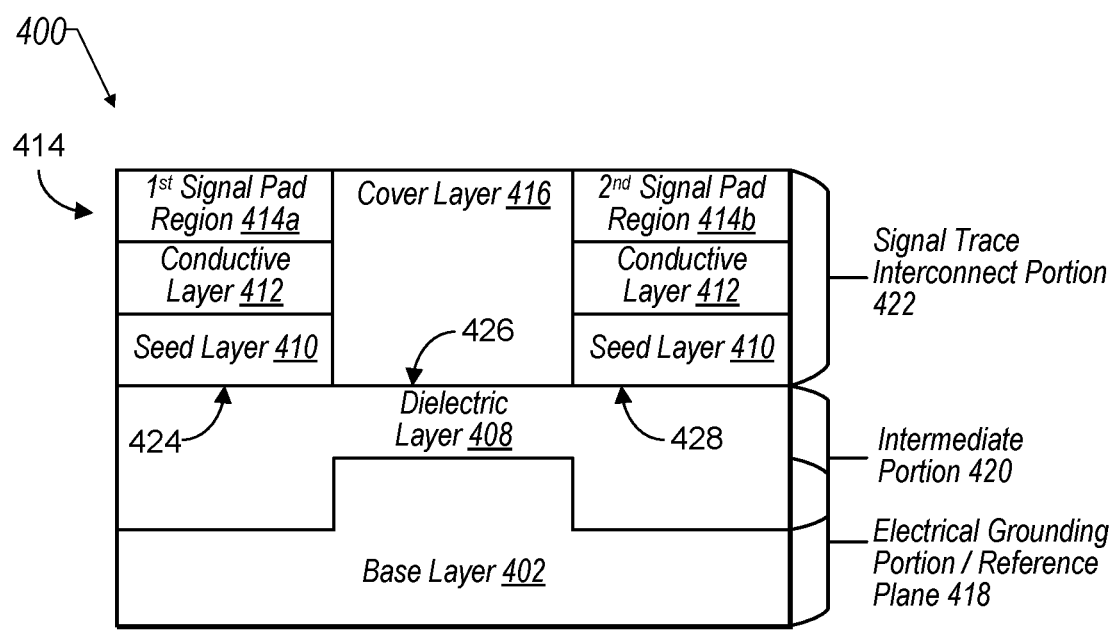
FIG. 4 illustrates a schematic diagram of an example sensor shift flexure arrangement for improved signal routing according to some aspects.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments include sensor shift flexure arrangements for improved signal routing, e.g., in cameras with sensor shift actuation. For example, a camera system may include a lens group, an image sensor package, a flexure (which may include one or more aspects of the sensor shift flexure arrangements disclosed herein), and/or a flex circuit. Furthermore, the camera system may include one or more actuators (e.g., voice coil motor (VCM) actuator(s)). In some embodiments, the actuator(s) may be used to move the image sensor package relative to the lens group to provide autofocus (AF) and/or optical image stabilization (OIS) functionality. In various embodiments, the flexure may be used to suspend the image sensor package (e.g., from a base structure of the camera system) and to allow motion of the image sensor package enabled by the actuator(s). In some embodiments, the flexure may be coupled with the image sensor package and the flex circuit. The flexure may be configured to convey electrical signals between the image sensor package and the flex circuit. Furthermore, the flex circuit may be configured to convey electrical signals between the flexure and one or more external components that are external to the camera module.

In various embodiments, the flexure may include a stack of layers that are arranged so as to improve signal routing, relative to other camera systems that are arranged differently. As an example, the flexure may include a conductive layer and a ground layer. In some aspects, an insulating layer may be positioned between the conductive layer and the ground layer separating the conductive layer from the ground layer. A first area may be beneath at least a section of a signal pad region of the conductive layer and a second area may be beneath at least a section of a signal trace region of the conductive layer. A distance between the conductive layer and the ground layer at the first area may greater than a distance between conductive layer and the ground layer at the second area. The greater distance at the first area relative to the second area may increase the impedance of the signal pad region to a target impedance that is closer to the impedance of the signal trace region.

As yet another example, the flexure may additionally or alternatively include an impedance adjusting feature configured to increase the impedance of the electrical signal pad to a target impedance that is closer to the impedance of a signal trace, relative to an impedance of the electrical signal pad if the flexure did not include the impedance adjusting feature. In some embodiments, the impedance adjusting feature may comprise (i) a void or (ii) a cavity that is at least partially filled with an insulating material (e.g., epoxy).

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

FIG. 1 illustrates a schematic block diagram of an example camera system 100 that may include a sensor shift flexure arrangement for improved signal routing in according to some aspects. According to various embodiments, the camera system 100 may include a lens group 102, an image sensor package 104, a flexure 106 (which may include sensor shift flexure arrangement), and/or a flex circuit 108. Furthermore, the camera system 100 may include one or more actuators (e.g., voice coil motor (VCM) actuator(s), as discussed herein with reference to FIG. 16). The lens group 102 may include one or more lens elements that define an optical axis 110. Additionally, or alternatively, the camera system 100 may have an optical axis that is orthogonal to an image plane defined by an image sensor (e.g., image sensor 704 in FIG. 16) in the image sensor package 104. The image sensor may receive light that has passed through the lens group 102 and/or one or more other lens elements of the camera system 100. Furthermore, the image sensor may be configured to convert the captured light to image signals.

In various embodiments, the actuator(s) may be configured to move the image sensor package 104 (also referred to herein as "sensor shift actuation") and/or the lens group 102. For example, the actuator(s) may be used to move the image sensor package 104 relative to the lens group 102 to provide autofocus (AF) and/or optical image stabilization (OIS) functionality. For example, the actuator(s) may be used to shift the image sensor package 104 in at least one direction parallel to the optical axis (e.g., in the Z-axis direction), to provide AF functionality in some embodiments. Additionally, or alternatively, the actuator(s) may be used to shift the image sensor package 104 in directions orthogonal to the optical axis 110 (e.g., in the x-axis and/or Y-axis directions), to provide OIS functionality in some embodiments. Additionally, or alternatively, the actuator(s) may be used to move the lens group 102 relative to the image sensor package 104 to provide AF and/or OIS functionality.

As further discussed with reference to FIGS. 2 and 3A, the flexure 106 may be used to suspend the image sensor package 104 (e.g., from a base structure of the camera system 100) and to allow motion of the image sensor package 104 enabled by the actuator(s). In some embodiments, the flexure 106 may be coupled with the image sensor package 104 and the flex circuit 108, e.g., as indicated in FIG. 1. As discussed with reference to FIGS. 3A and 3B, flexure 106 may be configured to convey electrical signals between the image sensor package 104 and the flex circuit 108. Furthermore, the flex circuit 108 may be configured to convey electrical signals between the flexure 106 and one or more external components 112 that are external to the camera module.

In various embodiments, the flexure 106 may include a stack of layers that are arranged so as to improve signal routing, relative to other systems (e.g., camera systems) that are arranged differently. As an example, the flexure 106 may include a first area beneath a signal pad region (e.g., including one or more signal pads) that has a greater distance to a grounding layer than a second area beneath of signal trace region (e.g., including one or more signal traces), which may increase the impedance of the signal pad region (e.g., at least one signal pad) to a target impedance that is closer to the impedance of the signal trace region (e.g., at least one signal trace), relative to an impedance of the signal pad region (e.g., the at least one signal pad) if the insulating layer did not include the increased distance at the first area, as similarly described herein with reference to FIGS. 4-9, 13, and 14.

As another example, the flexure 106 may additionally or alternatively include an impedance adjusting feature also configured to increase the impedance of the signal pad region (e.g., one or more signal pads) to a target impedance that is closer to the impedance of the signal trace region (e.g., one or more signal traces), relative to an impedance of the signal pad region (e.g., at least one signal pad) if the flexure did not include the impedance adjusting feature. In some embodiments, the impedance adjusting feature may comprise (i) a void or (ii) a cavity that is at least partially filled with an insulating material (e.g., epoxy), e.g., as similarly discussed herein with reference to FIGS. 13-15.

FIG. 2 illustrates a top view of example sensor shift flexure 106 that may include a sensor shift flexure arrangement for improved signal routing according to some aspects. In various embodiments, the flexure 106 may include an inner frame 202, an outer frame 204, and/or one or more flexure arms 206. The inner frame 202 may be fixedly coupled with the image sensor (e.g., via the image sensor package 104). In some embodiments, the image sensor package 104 may include a substrate (e.g., substrate 310 in FIGS. 3A and 3B, substrate 1612 in FIG. 16, etc.) to which the image sensor is fixedly attached, and the substrate may be fixedly attached to the inner frame 202. The outer frame 204 may at least partially encircle the inner frame 202. The outer frame 204 may be fixedly coupled with a stationary structure (e.g., stationary structure 1624 in FIG. 16) of the camera. The flexure arm(s) 206 may be connected to the inner frame 202 and to the outer frame 204, e.g., as indicated in FIG. 2. According to various embodiments, the flexure 106 may include electrical traces on at least a portion of the flexure arm(s) 206. The electrical traces may be configured to convey electrical signals between the inner frame 202 and the outer frame 204, and vice-versa. In various embodiments, different patterns of electrical traces may be routed from the inner frame 202 to the outer frame 204, and/or from the outer frame 204 to a flex circuit (e.g., flex circuit 304 in FIG. 3A). The electrical trace(s) may be insulated (e.g., via a dielectric layer and/or a cover layer) in various embodiments.

According to some embodiments, the flexure 106 may include one or more electrical signal pad regions, such as, but not limited to, electrical signal pad region 208 (e.g., comprising electrical signal pad 210) on the inner frame 202 and/or electrical signal pad region 212 (e.g., comprising electrical signal pad 214) on the outer frame 204. In various embodiments, electrical traces 216 may be routed on the inner frame 202, the flexure arm(s) 206, and/or the outer frame 204. According to various embodiments, electrical traces 216 may be routed from the electrical signal pads on the inner frame 202 to the electrical signal pads on the outer frame 204, via the flexure arm(s) 206. In some embodiments, the electrical signal traces may follow routing paths that correspond to the paths of the flexure arm(s) 206 as they extend from the inner frame 202 to the outer frame 204. The electrical signal traces may be routed above and/or below the flexure arm(s) 206 in some embodiments. Additionally, or alternatively, the electrical signal traces may be at least partially embedded within the flexure arm(s) 206 in some embodiments.

FIGS. 3A-3B illustrate schematic block diagrams of portions of example cameras that may include a sensor shift flexure arrangement for improved signal routing, in accordance with some embodiments. FIG. 3A shows a portion of an example camera 300a including a flexure 302 that is attached to a flex circuit 304, e.g., via an electrical signal pad 306. FIG. 3B shows a portion of an example camera 300b including a flexure-circuit hybrid structure 308. In various embodiments, anisotropic conductive film (ACF) bonding may be used to attach components together; however, it should be appreciated that one or more other attachment processes (e.g., a surface-mount technology (SMT) attachment process, a hot bar bonding process, etc.) may additionally, or alternatively, be used for attachment of components in various embodiments.

As indicated in FIGS. 3A-3B, the cameras 300a and 300b may include a substrate 310 that is bonded to the flexure 302 (in FIG. 3A) or to the flexure-circuit hybrid structure 308 (in FIG. 3B), e.g., via electrical signal pad 312. The substrate 310 may be bonded to an image sensor (e.g., image sensor 704 in FIG. 16). In some embodiments, the image sensor and/or the substrate 310 may be included in the image sensor package 104 in FIG. 1. Instead of bonding a flexure to a flex circuit (as in FIG. 3A), the flexure-circuit hybrid structure 308 may be a single component that integrates structural and/or functional aspects of the flexure and the flex circuit, thus eliminating the need for the electrical signal pad 312 (FIG. 3A).

In camera 300a, the flex circuit 304 may be bonded to one or more external components 314, e.g., via electrical signal pad 316. The flexure-circuit hybrid structure 308 in camera 300b may be bonded to external component(s) 314, e.g., via electrical signal pad 316. In FIGS. 3A-3B, the components (and/or portions of components) within broken rectangle 318 may be located within the corresponding camera module, while the components (and/or portions of components) outside of the broken rectangle 318 may be considered external to the camera module. The exterior component(s) 314 bonded to the flex circuit 304 (FIG. 3A) or to the flexure-circuit hybrid structure 308 (FIG. 3B) are shown as being outside of the broken rectangle 318 to indicate that the external component(s) 314 are external to the corresponding camera module.

Electrical signals may be routed between the image sensor and the external component(s) 314 at least partly via the flexure 302 (FIG. 3A) or the flexure-circuit hybrid structure 308 (FIG. 3B). For example, electrical signals may be routed along a path that includes the image sensor, an electrical signal pad for interconnecting the image sensor with the substrate 310, the substrate 310, electrical signal pad 312, the flexure 302 (FIG. 3A) or the flexure-circuit hybrid structure 308 (FIG. 3B), electrical signal pad 306 (FIG. 3A), the flex circuit 304 (FIG. 3A), electrical signal pad 316, and the external component(s) 314, in that order from the image sensor to the external component(s) 314, and/or vice-versa. Additionally, or alternatively, the camera 300a may include a via 320 that is used to route electrical signals from one side (e.g., a bottom side) of the flex circuit 304 to the opposite side (e.g., a top side) of the flex circuit 304.

FIG. 4 illustrates a schematic diagram of an example sensor shift flexure arrangement 400 for improved signal routing according to some aspects. As shown in FIG. 4, the example sensor shift flexure arrangement 400 may include layers of material that are stacked in a direction orthogonal to an image plane of an image sensor (e.g., the image sensor included in the image sensor package 104 in FIG. 1, image sensor 1604 in FIG. 16, etc.). According to various embodiments, the stack-up of layers may include a base layer 402, a dielectric layer 408, a seed layer 410, and/or a conductive layer 412. In some aspects, an adhesion layer may be positioned between the dielectric layer 408 and the base layer 402.

Furthermore, the sensor shift flexure arrangement 400 may include a one or more signal pad regions 414 including, for example, a first signal pad region 414a and a second signal pad region 414b. In some aspects, at least one signal pad in a signal pad region may be at least one of a higher-speed signal pad, an electroless nickel immersion gold (ENIG) pad, or the like. In some embodiments, one or more portions of the sensor shift flexure arrangements 400 may include a cover layer 416 (e.g., polyimide (PI), a hybrid-style PI and adhesive material provided as a laminated cover layer, etc.), such as the one positioned, in a direction parallel to the image plane, between first signal pad region 414a and the second signal pad region 414b. In some embodiments, the cover layer 416 may cover conductive layer 412 in certain portions of the flexure, e.g., such that the covered portions of conductive layer 412 are sandwiched between the cover layer 416 and one or more other layers (e.g., the seed layer 410).

In some aspects, the base layer 402 may form at least a portion of an electrical grounding portion 418 (which may comprise a reference plane). The dielectric layer 408 may form at least a portion of an intermediate portion 420. The seed layer 410, the conductive layer 412 and/or the one or more signal pad regions 414 may form at least a portion of a signal trace interconnect portion 422 that may be used to interconnect signal traces on the flexure with one or more other components, e.g., as discussed herein with reference to FIGS. 1-3B.

In some embodiments, the signal trace interconnect portion 422 may be located at the inner frame (e.g., inner frame 202 in FIG. 2) and/or the outer frame (e.g., outer frame 204 in FIG. 2) of the flexure. As a non-limiting example, the signal trace interconnect portion 422 may be located in electrical signal pad region 208 indicated in FIG. 2. For example, the one or more signal pad regions 414 may include an electrical signal pad used for connecting the inner frame of the flexure with an image sensor substrate (and/or another component of the image sensor package), e.g., as does electrical signal pad 312 with respect to connecting flexure 302 to substrate 310 in FIG. 3A. As another non-limiting example, the signal trace interconnect portion 422 may be located in electrical signal pad region 212 indicated in FIG. 2. For example, the one or more signal pad regions 414 may include an electrical signal pad used for connecting the outer frame of the flexure with a flex circuit (and/or one or more other components), e.g., as does electrical signal pad 306 with respect to connecting flexure 302 to flex circuit 304 in FIG. 3A.

In various embodiments, the one or more signal pad regions 414 may be constrained to a relatively large size of width and/or length by the type of process(es) used for attaching the flexure with other component(s). Non-limiting examples of attachment processes may include an ACF bonding process, an SMT attachment process, and/or a hot bar bonding process, etc. The large size of the one or more signal pad regions 414 and/or one or more signal pads of the one or more signal pad regions 414 may cause the one or more signal pad regions 414 and/or the one or more signal pads of the one or more signal pad regions 414 to have a relatively low impedance which may result in poor channel performance for electrical signals (e.g., higher-speed signals) when there is a mismatch between the impedance of the one or more signal pad regions 414 and/or the one or more signal pads of the one or more signal pad regions 414 and the corresponding signal channel(s) (e.g., the electrical signal trace(s) formed by the conductive layer 412).

As shown in FIG. 4, the signal trace interconnect portion 422 may include at least a first area 424 and a second area 426. The first area 424 may be a surface of the signal trace interconnect portion 422 that is adjacent (e.g., abutting, next to) at least a portion of the intermediate portion 420. For example, as shown in FIG. 4, the first area 424 may be adjacent at least a portion of the dielectric layer 408. The second area 426 may be another surface of the signal trace interconnect portion 422 that is adjacent (e.g., abutting, next to) at least another portion of the intermediate portion 422. For example, as shown in FIG. 4, the second area 426 may be a surface of the cover layer 416. In some aspects, the second area 426 may be a surface aligned with one or more electrical traces (e.g., electrical traces 216 illustrated in FIG. 2), for example, embedded within the cover layer 416. Additionally, or alternatively, the second area 426 may be adjacent (e.g., aligned with) the dielectric layer 408.

In some aspects, the first area 424 may be beneath (e.g., aligned with, a lower surface of) at least a portion of the first signal pad region 414a. For example, the first area 424 may be beneath the first signal pad region 414a and positioned along an axis that is perpendicular to the first area 424 and intersects with the first signal pad region 414*a*. In some aspects, the first area 424 may be beneath the entire first signal pad region 414*a*. Additionally, or alternatively, the first area 424 may be beneath one or more signal pads disposed on and/or in the first signal pad region 414*a* and/or not beneath a remainder of the first signal pad region 414*a*.

The second area 426 may be beneath (e.g., aligned with, a lower surface of) at least a portion of the cover layer 416. For example, the second area 426 may be beneath the cover layer 416 and positioned along an axis that is perpendicular to the second area 426 and intersects with the cover layer 416. In some aspects, the cover layer 416 may be beneath or may embedded one or more electrical traces (e.g., electrical traces 216 illustrated in FIG. 2) routed on an inner frame (e.g., the inner frame 202 illustrated in FIG. 2), one or more flexure arms (e.g., flexure arm(s) 206 illustrated in FIG. 2), and/or an outer frame (e.g., the outer frame 204 illustrated in FIG. 2) and/or not beneath a remainder of the cover layer 416. For example, the second area 426 may be beneath one or more signal traces aligned with the cover layer 416.

When, for example, a dielectric layer has a substantially similar depth (e.g., a same depth) across signal pad region(s) (e.g., one or more signal pads) and a cover layer (e.g., one or more signal traces at a same elevation as the one or more signal pads), the distance between the signal pads and the base layer and the distance between the signal traces (e.g., located within the cover layer) and base layer may be substantially similar. In this case, the impedance at the signal traces may be greater than the impedance at the one or more signal pads creating channel return loss and less signal integrity. Conversely, if, for example, a dielectric layer has varying depths such that, for example, a depth of the dielectric layer beneath a signal pad region (e.g., one or more signal pads) is greater than a depth of the dielectric layer beneath a cover layer (e.g., one or more electrical traces), the additional depth of the dielectric layer beneath the signal pad region may increase the distance between signal pad region and the base layer (e.g., compared to the distance between the one or more electrical traces and the base layer) and increase the impedance of the signal pad region to better match a target channel impedance (e.g., an impedance at the electrical traces) enabling time domain reflectometry (TDR) improvements. Better matching pad impedance to the channel impedance may help reduce channel return loss. Reducing channel return loss may improve signal integrity. Improving signal integrity may enable a higher bandwidth for the channel. Furthermore, improving signal integrity may help reduce system power consumption, e.g., by reducing signal/power transmitter swing and/or optimizing signal/power receiver equalization needs.

As shown in FIG. 4, the signal trace interconnect portion 422 includes the first area 424, that is aligned with the first signal pad region 414*a* (e.g., one or more signal pads) and is aligned with a region of the base layer 402 forming a greater distance between the first signal pad region 414*a* and the base layer 402 than a region of the signal trace interconnect portion 422 at the second area 426, that is aligned with the cover layer 416 (e.g., one or more electrical traces). The greater depth of the dielectric layer 408 at (e.g., beneath) the first area 424 and/or the greater height of the base layer 402 may provide a greater distance between the first signal pad region 414*a* and the base layer 402 and may cause the impedance at the first signal pad region 414*a* to be relatively closer to (e.g., substantially similar to, substantially the same as, the same as) the impedance at the cover layer 416 (e.g., one or more electrical traces). For example, as shown in FIG. 4, the base layer 402 includes at least two different thicknesses: a first thickness beneath the first area 424 of the signal trace interconnect portion 422 and a second thickness beneath the second area 426 of the signal trace interconnect portion 422. The first thickness may be less than the second thickness so that a distance between the first signal pad region 414*a* and the base layer 402 (e.g., through the dielectric layer 408) is greater than a distance between the cover layer 416 (e.g., one or more signal traces on and/or within the cover layer 416) and the base layer 402 (e.g., through the dielectric layer 408).

It should be understood that greater the distance between the first signal pad region 414*a* and the base layer 402, the greater the impedance at the first signal pad region 414*a*. Thus, distance between the first signal pad region 414*a* (e.g., one or more signal pads) and the base layer 402 may be set to a target distance to achieve a target impedance so that the impedance at the first signal pad region 414*a* (e.g., at least one signal pad at the first signal pad region 414*a*) is at least similar to or the same as the impedance at the cover layer 416 (e.g., at least one electrical trace aligned with the cover layer 416).

In some aspects, the signal trace interconnect portion 422 may include at least a first area 424 and a second area 426. The first area 424 may be a surface of the signal trace interconnect portion 422 that is adjacent (e.g., abutting, next to) at least a portion of the intermediate portion 420. For example, as shown in FIG. 4, the first area 424 may be adjacent at least a portion of the dielectric layer 408. The second area 426 may be another surface of the signal trace interconnect portion 422 that is adjacent (e.g., abutting, next to) at least another portion of the intermediate portion 422. For example, as shown in FIG. 4, the second area 426 may be a surface of the cover layer 416. In some aspects, the second area 426 may be a surface aligned with one or more electrical traces (e.g., electrical traces 216 illustrated in FIG. 2), for example, embedded within the cover layer 416. Additionally, or alternatively, the second area 426 may be adjacent (e.g., aligned with) the dielectric layer 408.

In some aspects, the first area 424 may be beneath (e.g., aligned with, a lower surface of) at least a portion of the first signal pad region 414*a*. For example, the first area 424 may be beneath the first signal pad region 414*a* and positioned along an axis that is perpendicular to the first area 424 and intersects with the first signal pad region 414*a*. In some aspects, the first area 424 may be beneath the entire first signal pad region 414*a*. Additionally, or alternatively, the first area 424 may be beneath one or more signal pads disposed on and/or in the first signal pad region 414*a* and/or not beneath a remainder of the first signal pad region 414*a*.

As shown in FIG. 4, the signal trace interconnect portion 422 includes the third area 428, that is aligned with the second signal pad region 414*b* (e.g., one or more signal pads) and is aligned with a region of the dielectric layer 408 that has a greater depth to the base layer 402 than a region of the dielectric layer 408 at the second area 426, that is aligned with the cover layer 416 (e.g., one or more electrical traces). The greater depth of the dielectric layer 408 at (e.g., beneath) the third area 428 may provide a greater distance between the second signal pad region 414*b* and the base layer 402 and may cause the impedance at the second signal pad region 414*b* to be relatively closer to (e.g., substantially similar to, substantially the same as, the same as) the impedance at the cover layer 416 (e.g., one or more electrical traces). It should be understood that the distance between the second signal pad region 414*b* and the base layer 402, the greater the impedance at the second signal pad region 414*b*. Thus, the depth of the dielectric layer 408 beneath the third area 428 and/or the distance between the second signal pad region 414*b* (e.g., one or more signal pads) and the base layer 402 may be set to a target depth or distance to achieve a target impedance so that the impedance at the second signal pad region 414*b* (e.g., at least one signal pad at the second signal pad region 414*b*) is at least similar to or the same as the impedance at the cover layer 416 (e.g., at least one electrical trace aligned with the cover layer 416). For example, as shown in FIG. 4, the base layer 402 includes different thicknesses: a first thickness beneath the first area 424 of the dielectric layer 408, a second thickness beneath the second area 426 of the signal trace interconnect portion 422, and a third thickness beneath the third area 428 of the signal trace interconnect portion 422. The first thickness and the third thickness may be less than the second thickness so that a distance between the first signal pad region 414*a* and the base layer 402 and the second signal pad region 414*b* and the base layer 402 are both greater than a distance between the cover layer 416 and the base layer 402.

In some aspects, when a difference in impedance between the first signal pad region 414*a* and the cover layer 416 is at least the same as or at least similar to a difference in impedance between the second signal pad region 414*b* and the cover layer 416, then the distance between the second signal pad region 414*b* and the base layer 402 (e.g., a depth of the dielectric layer 408 at the third area 428) may be the same as or at least similar to distance between the first signal pad region 414*a* and the base layer 402 (e.g., a depth of the dielectric layer 408 at the first area 424). In some aspects, when a difference in impedance between the first signal pad region 414*a* and the cover layer 416 is a first impedance difference and a difference in impedance between the second signal pad region 414*b* and the cover layer 416 is a second and different impedance difference, then the distance between the first signal pad region 414*a* and the base layer 402 may be a different distance than the distance between the second signal pad region 414*b* and the base layer 402. For example, when the first impedance difference is greater than the second impedance difference, then the distance between the first signal pad region 414*a* and the base layer 402 (e.g., a depth of the dielectric layer 408 at the first area 424) may be greater than a distance between the second signal pad region 414*b* and the base layer 402 (e.g., a depth the dielectric layer 408 at the third area 428). As another example, when the first impedance difference is less than the second impedance difference, then the distance between the first signal pad region 414*a* and the base layer 402 (e.g., a depth of the dielectric layer 408 at the first area 424) may be less than the distance between the second signal pad region 414*b* and the base layer 402 (e.g., a depth the dielectric layer 408 at the third area 428).

Figure 5:
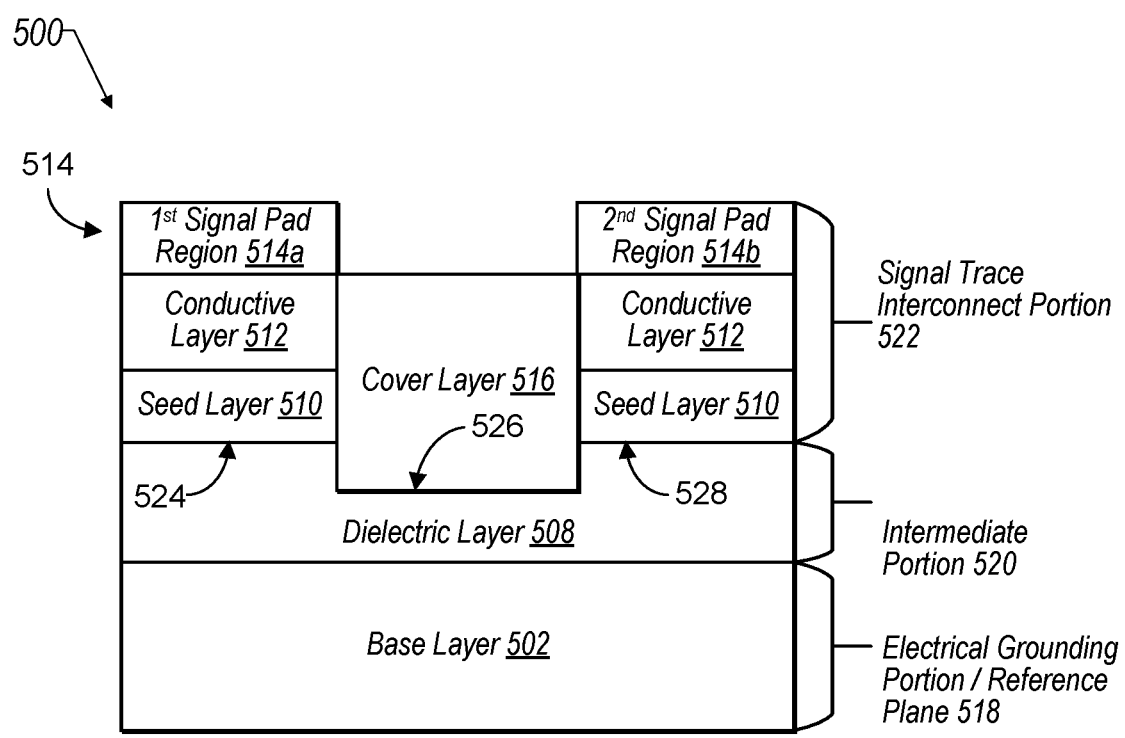
FIG. 5 illustrates a schematic diagram of another example sensor shift flexure arrangement for improved signal routing according to some aspects.

FIG. 5 illustrates a schematic diagram of another example sensor shift flexure arrangement 500 for improved signal routing according to some aspects. The sensor shift flexure arrangement 500 may include one or more same or similar features as camera system 100 of FIG. 1, the sensor shift flexure 106 of FIG. 2, the camera 300*a* of FIG. 3A, the camera 300*b* of FIG. 3B, and/or the sensor shift flexure arrangement 400 of FIG. 4. For example, the sensor shift flexure arrangement 500 may include a base layer 502, a dielectric layer 508, a seed layer 510, a conductive layer 512, one or more signal pad regions 514 including a first signal pad region 514*a* and a second signal pad region 514*b*, a cover layer 516. The sensor shift flexure arrangement 500 may also include an electrical grounding portion/reference plane 518 having at least the base layer 502, an intermediate portion 520 having at least the adhesion layer 506 and the dielectric layer 508, and/or a signal trace interconnect portion 522 having at least the seed layer 510, the conductive layer 512, the one or more signal pad regions 514, and the cover layer 516. In some aspects, an adhesion layer may be positioned between the dielectric layer 508 and the base layer 502.

As shown in FIG. 5 and at least similar to the sensor shift flexure arrangement 400 illustrated in FIG. 4, the distance between the first signal pad region 514*a* and the base layer 502 and the distance between the second signal pad region 514*b* and the base layer 502 may be greater than a distance between the cover layer 516 and the base layer 502. For example, the distance between the first signal pad region 514*a* and the base layer 502 and the distance between the second signal pad region 514*b* and the base layer 502 may be greater than a distance between the cover layer 516 and the base layer 502 due to the dielectric layer 508 at the first area 524 and/or the dielectric layer 508 at the third area 528 having a greater depth than the dielectric layer 508 at a second area 526. The greater the distance between the first signal pad region 514*a* and the base layer 502, the greater the impedance at the first signal pad region 514*a*. For example, the distance between the first signal pad region 514*a* (e.g., one or more signal pads) and the base layer 502 (e.g., the depth of the dielectric layer 508 beneath the first area 524) may be set to a target distance to achieve a target impedance so that the impedance at the first signal pad region 514*a* (e.g., at least one signal pad at the first signal pad region 514*a*) is at least similar to or the same as the impedance at the cover layer 516 (e.g., at least one electrical trace aligned with the cover layer 516). Similarly, the distance between the second signal pad region 514*b* (e.g., one or more signal pads) and the base layer 502 may be set to a target depth or distance to achieve a target impedance so that the impedance at the second signal pad region 514*b* (e.g., at least one signal pad at the second signal pad region 514*b*) is at least similar to or the same as the impedance at the cover layer 516 (e.g., at least one electrical trace aligned with the cover layer 516). In this example, the sensor shift flexure arrangement 500, due to the increased thickness of the dielectric layer 508 beneath the first area 524 and the third area 528, may have a greater height at the first signal pad region 514*a* and at the second signal pad region 514*b* compared to the cover layer 516.

Figure 6:
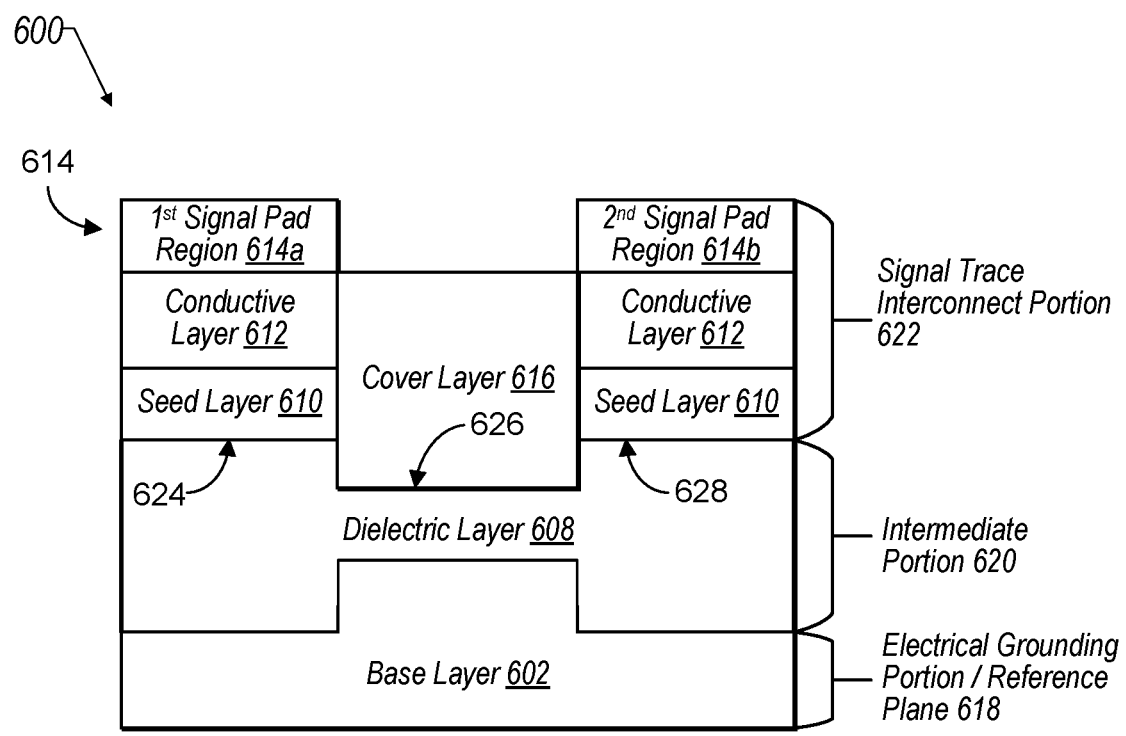
FIG. 6 illustrates a schematic diagram of yet another example sensor shift flexure arrangement for improved signal routing according to some aspects.

FIG. 6 illustrates a schematic diagram of yet another example sensor shift flexure arrangement 600 for improved signal routing according to some aspects. The sensor shift flexure arrangement 600 may include one or more same or similar features as camera system 100 of FIG. 1, the sensor shift flexure 106 of FIG. 2, the camera 300*a* of FIG. 3A, the camera 300*b* of FIG. 3B, the sensor shift flexure arrangement 400 of FIG. 4, and/or the sensor shift flexure arrangement 500 of FIG. 5. For example, the sensor shift flexure arrangement 600 may include a base layer 602, an adhesion layer 606, a dielectric layer 608, a seed layer 610, a conductive layer 612, one or more signal pad regions 614 including a first signal pad region 614*a* and a second signal pad region 614*b*, a cover layer 616. The sensor shift flexure arrangement 600 may also include an electrical grounding portion/reference plane 618 having at least the base layer 602, an intermediate portion 620 having at least the adhesion layer 606 and the dielectric layer 608, and/or a signal trace interconnect portion 622 having at least the seed layer 610, the conductive layer 612, the one or more signal pad regions 614, and the cover layer 616. In some aspects, an adhesion layer may be positioned between the dielectric layer 608 and the base layer 602.

As shown in FIG. 6 and at least similar to the sensor shift flexure arrangement 400 illustrated in FIG. 4 and the sensor shift flexure arrangement 500 illustrated in FIG. 5, the distance between the first signal pad region 614a and the base layer 602 and the distance between the second signal pad region 614b and the base layer 602 may be greater than a distance between the cover layer 616 and the base layer 602. For example, the distance between the first signal pad region 614a and the base layer 602 and the distance between the second signal pad region 614b and the base layer 602 may be greater than a distance between the cover layer 616 and the base layer 602 due to the dielectric layer 608 at the first area 624 and/or the dielectric layer 608 at the third area 628 having a greater depth than the dielectric layer 608 at a second area 626. The greater the distance between the first signal pad region 614a and the base layer 602, the greater the impedance at the first signal pad region 614a. For example, the distance between the first signal pad region 614a (e.g., one or more signal pads) and the base layer 602 (e.g., the depth of the dielectric layer 608 beneath the first area 624) may be set to a target distance to achieve a target impedance so that the impedance at the first signal pad region 614a (e.g., at least one signal pad at the first signal pad region 614a) is at least similar to or the same as the impedance at the cover layer 616 (e.g., at least one electrical trace aligned with the cover layer 616). Similarly, the distance between the second signal pad region 614b (e.g., one or more signal pads) and the base layer 602 may be set to a target depth or distance to achieve a target impedance so that the impedance at the second signal pad region 614b (e.g., at least one signal pad at the second signal pad region 614b) is at least similar to or the same as the impedance at the cover layer 616 (e.g., at least one electrical trace aligned with the cover layer 616).

In the example of FIG. 6, the base layer 602 includes different thicknesses: a first thickness beneath the first area 624 of the dielectric layer 608, a second thickness beneath the second area 626 of the dielectric layer 608, and a third thickness beneath the third area 628 of the dielectric layer 608. The first thickness and the third thickness may be less than the second thickness so that a distance between the first signal pad region 614a and the base layer 602 and the second signal pad region 614b and the base layer 602 are both greater than a distance between the cover layer 616 and the base layer 602. In addition, the sensor shift flexure arrangement 600, due to the increased thickness of the dielectric layer 608 beneath the first area 624 and the third area 628, may have a greater height at the first signal pad region 614a and at the second signal pad region 614b compared to the cover layer 616 so that a distance between the first signal pad region 614a and the base layer 602 and the second signal pad region 614b and the base layer 602 are both greater than a distance between the cover layer 616 and the base layer 602.

Figure 7:
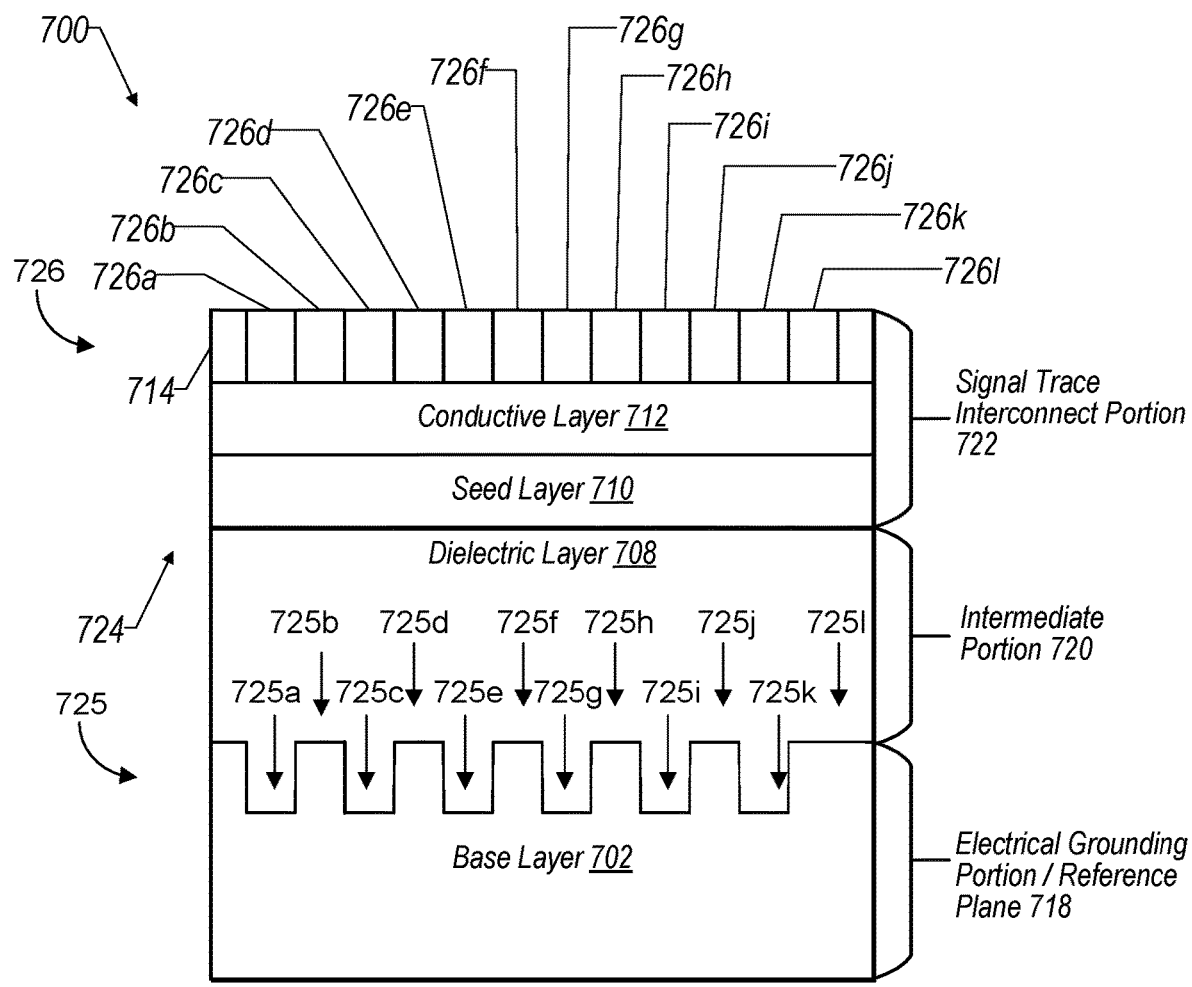
FIG. 7 illustrates a schematic diagram of an example sensor shift flexure arrangement for improved signal routing according to some aspects.

FIG. 7 illustrates a schematic diagram of another example sensor shift flexure arrangement 700 for improved signal routing according to some aspects. The sensor shift flexure arrangement 700 may include one or more same or similar features as camera system 100 of FIG. 1, the sensor shift flexure 106 of FIG. 2, the camera 300a of FIG. 3A, the camera 300b of FIG. 3B, the sensor shift flexure arrangement 400 of FIG. 4, the sensor shift flexure arrangement 500 of FIG. 5, and/or the sensor shift flexure arrangement 600 of FIG. 6. For example, the sensor shift flexure arrangement 700 may include a base layer 702, a dielectric layer 708, a seed layer 710, a conductive layer 712, and a signal pad region 714. The sensor shift flexure arrangement 700 may also include an electrical grounding portion/reference plane 718 having at least the base layer 702, an intermediate portion 720 having at least the dielectric layer 708, and/or a signal trace interconnect portion 722 having at least the seed layer 710, the conductive layer 712, and the signal pad region 714. As shown in FIG. 7, the intermediate portion 720 may include at least a first area 724 of the signal trace interconnect portion 722. Similar to the signal trace interconnect portion 422 in FIG. 4, the signal trace interconnect portion 522 in FIG. 5, and/or the signal trace interconnect portion 622 illustrated in FIG. 6, the signal trace interconnect portion 722 may also include at least a second area and/or a third area as described herein.

Also, as shown in FIG. 7, the base layer 702 may have different heights beneath the first area 724 varying the distance between the first signal pad region 726 and the base layer 702. For example, a first indented section 725a, a second indented section 725c, a third indented section 725e, a fourth indented section 725g, a fifth indented section 725i, and a sixth indented section 725k each of the base layer 702 beneath the first area 724 may provide a greater distance between the first signal pad region 714 and the base layer 702 than a first extended section 725b, a second extended section 725d, a third extended section 725f, a fourth extended section 725h, a fifth extended section 725j, and a sixth extended section 725l each also of the base layer 702 beneath the first area 724.

In some aspects, the signal pad region 714 may include one or more signal pad region slots 726. The one or more signal pad region slots 726 may include at least one signal pad region slot for a higher-speed signal pad. For example, as shown in FIG. 7, the one or more signal pad region slots 726 may include a first higher-speed signal pad slot 726a, a second higher-speed signal pad slot 726c, a third higher-speed signal pad slot 726e, a fourth higher-speed signal pad slot 726g, a fifth higher-speed signal pad slot 726i, and a sixth higher-speed signal pad slot 726k. Each of the first higher-speed signal pad slot 726a, the second higher-speed signal pad slot 726c, the third higher-speed signal pad slot 726e, the fourth higher-speed signal pad slot 726g, the fifth higher-speed signal pad slot 726i, and the sixth higher-speed signal pad slot 726k may include a higher-speed signal pad as described herein.

Additionally, or alternatively, the one or more signal pad region slots 726 may include at least one signal pad region slot for a lower-speed signal pad. For example, the one or more signal pad region slots 726 may include a first lower-speed signal pad slot 726b, a second lower-speed signal pad slot 726d, a third lower-speed signal pad slot 726f, a fourth lower-speed signal pad slot 726h, a fifth lower-speed signal pad slot 726j, and a sixth lower-speed signal pad slot 726l. Each of the first lower-speed signal pad slot 726b, the second lower-speed signal pad slot 726d, the third lower-speed signal pad slot 726f, the fourth lower-speed signal pad slot 726h, the fifth lower-speed signal pad slot 726j, and the sixth lower-speed signal pad slot 726l may include a lower-speed signal pad as described herein. The higher-speed signal pad slots and the lower-speed signal pad slots may be arranged in an alternating pattern within the signal pad region 714. As described further here, the higher-speed signal pad slots and the lower-speed signal pad slots may be grouped together, as described further herein, and/or may be arranged in an alternating group pattern within the signal pad region 714. In some aspects, the higher-speed signal pad slots and the lower-speed signal pad slots may be arranged randomly or according to one or more specified arrangements.

As shown in FIG. 7, the first indented section 725a, the second indented section 725c, the third indented section 725e, the fourth indented section 725g, the fifth indented section 725i, and the sixth indented section 725k of the base layer 702 beneath the first area 724 may be vertically aligned with the first higher-speed signal pad slot 726a, the second higher-speed signal pad slot 726c, the third higher-speed signal pad slot 726e, the fourth higher-speed signal pad slot 726g, the fifth higher-speed signal pad slot 726i, and the sixth higher-speed signal pad slot 726k of the signal pad region 714, respectively. Similarly, the first extended section 725b, the second extended section 725d, the third extended section 725f, the fourth extended section 725h, the fifth extended section 725j, and the sixth extended section 725l of the base layer 702 beneath the first area 724 may be vertically aligned with the first lower-speed signal pad slot 726b, the second lower-speed signal pad slot 726d, the third lower-speed signal pad slot 726f, the fourth lower-speed signal pad slot 726h, the fifth lower-speed signal pad slot 726j, and the sixth lower-speed signal pad slot 726l of the signal pad region 714, respectively.

When a distance between one or more higher-speed signal pads and a base layer and a distance between one or more signal traces associated with the one or more higher-speed signal pads and the base layer is substantially similar (e.g., a same distance), the impedance at the one or more signal traces associated with the one or more higher-speed signal pads may be greater than the impedance at the higher-speed signal pad region slots creating channel return loss and less signal integrity. Conversely, if a base layer has varying heights such that, for example, a first height of the base layer beneath one or more higher-speed signal pad region slots (e.g., one or more higher-speed signal pads) is lower than a height of the base layer beneath a cover layer (e.g., one or more signal traces associated with the one or more higher-speed signal pads), a distance between the higher-speed signal pad region slots and the base layer that is greater than a distance between the one or more signal traces associated with the higher-speed signal pad region slots and the base layer may increase the impedance of the higher-speed signal pads to better match a target channel impedance (e.g., an impedance at the higher-speed signal traces) enabling time domain reflectometry (TDR) improvements. Better matching pad impedance to the channel impedance may help reduce channel return loss. Reducing channel return loss may improve signal integrity. Improving signal integrity may enable a higher bandwidth for the channel. Furthermore, improving signal integrity may help reduce system power consumption, e.g., by reducing signal/power transmitter swing and/or optimizing signal/power receiver equalization needs.

Similarly, when a distance between one or more lower-speed signal pads and a base layer and a distance between one or more signal traces associated with the one or more lower-speed signal pads and the base layer is substantially similar (e.g., a same distance), the impedance at the one or more signal traces associated with the one or more lower-speed signal pads may be greater than the impedance at the lower-speed signal pad region slots creating channel return loss and less signal integrity. Conversely, if a base layer has varying heights such that, for example, a second height of the base layer beneath one or more lower-speed signal pad region slots (e.g., one or more lower-speed signal pads) is lower than a height of the base layer beneath a cover layer (e.g., one or more signal traces associated with the one or more lower-speed signal pads), a distance between the lower-speed signal pad region slots and the base layer that is greater than a distance between the one or more signal traces associated with the lower-speed signal pad region slots and the base layer may increase the impedance of the lower-speed signal pads to better match a target channel impedance (e.g., an impedance at the lower-speed signal traces) enabling time domain reflectometry (TDR) improvements. Better matching pad impedance to the channel impedance may help reduce channel return loss. Reducing channel return loss may improve signal integrity. Improving signal integrity may enable a higher bandwidth for the channel. Furthermore, improving signal integrity may help reduce system power consumption, e.g., by reducing signal/power transmitter swing and/or optimizing signal/power receiver equalization needs.

It should be understood that an impedance difference between the impedance from the higher-speed signal pads to the base layer and the impedance from the signal traces associated with the higher-speed signal pads to the base layer may be greater than an impedance difference between the impedance from the lower-speed signal pads to the base layer and the impedance from signal traces associated with the higher-speed signal pads to the base layer. Thus, in order to match impedances associated with higher-speed signal pads, signal traces associated with the higher-speed signal pads, lower-speed signal pads, and signal traces associated with lower-speed signal pads, the distance between the lower-speed signal pads and the base layer may be greater than a distance between the signal traces associated with the lower-speed signal pad and the base layer and a distance between the signal traces associated with the higher-speed signal pads and the base layer, but less than a distance between the higher-speed signal pads and the base layer. In some aspects, the distance between the lower-speed signal pads and the base layer may less than the distance between the higher-speed signal pads and the base layer, but equal to the distance between the signal traces associated with the higher-speed signal traces and/or equal to the distance between the signal traces associated with the lower-speed signal pads and the base layer.

Figure 8:
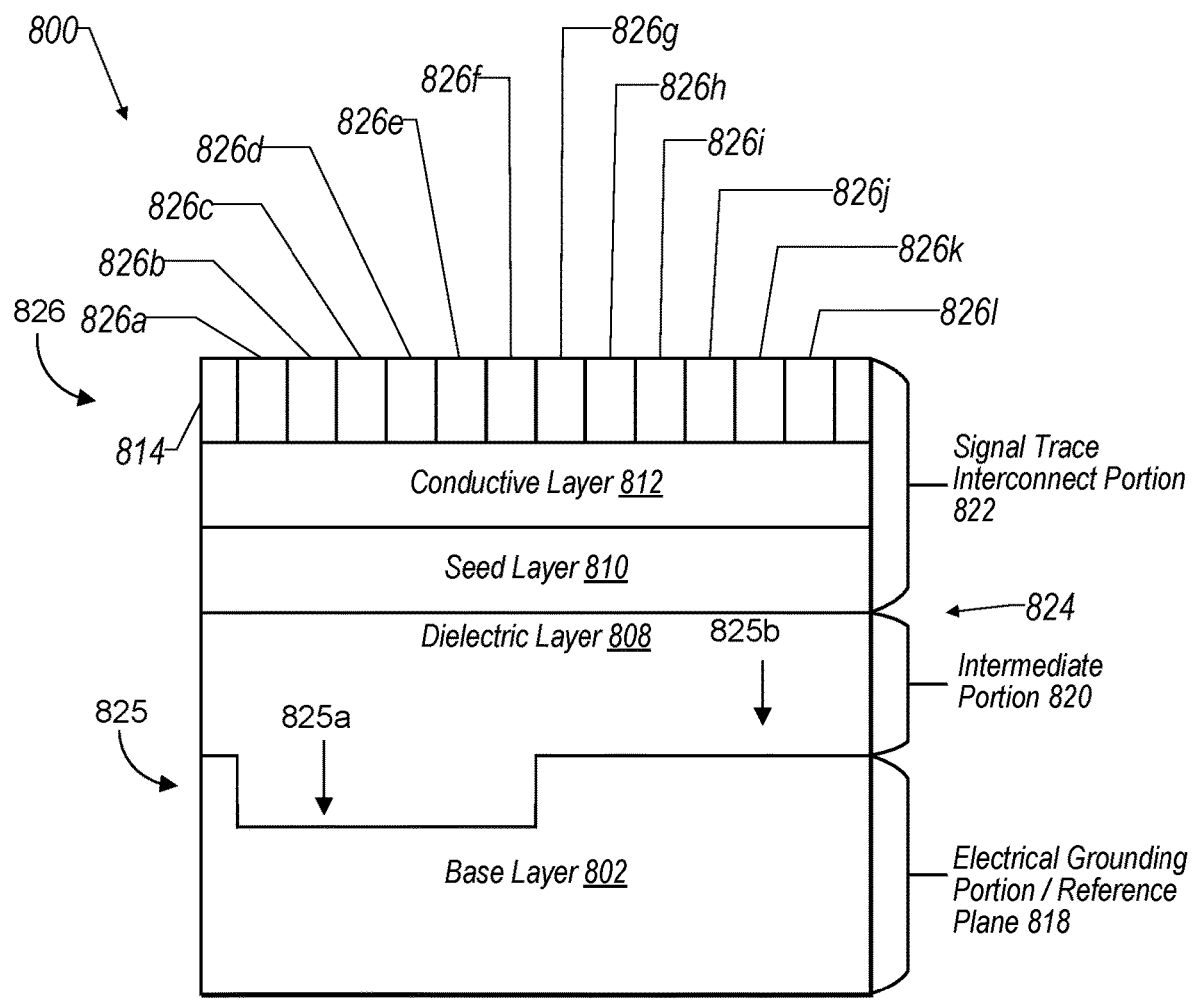
FIG. 8 illustrates a schematic diagram of another example sensor shift flexure arrangement for improved signal routing according to some aspects.

FIG. 8 illustrates a schematic diagram of yet another example sensor shift flexure arrangement 800 for improved signal routing according to some aspects. The sensor shift flexure arrangement 800 may include one or more same or similar features as camera system 100 of FIG. 1, the sensor shift flexure 106 of FIG. 2, the camera 300a of FIG. 3A, the camera 300b of FIG. 3B, the sensor shift flexure arrangement 400 of FIG. 4, the sensor shift flexure arrangement 500 of FIG. 5, the sensor shift flexure arrangement 600 of FIG. 6, and/or the sensor shift flexure arrangement 700 of FIG. 7. For example, the sensor shift flexure arrangement 800 may include a base layer 802, an adhesion layer 806, a dielectric layer 808, a seed layer 810, a conductive layer 812, and a signal pad region 814. The sensor shift flexure arrangement 800 may also include an electrical grounding portion/reference plane 818 having at least the base layer 802, an intermediate portion 820 the dielectric layer 808 (and in some aspects an adhesion layer), and/or a signal trace interconnect portion 822 having at least the seed layer 810, the conductive layer 812, and the signal pad region 814. As shown in FIG. 8, the intermediate portion 820 may include at least a first area 824 of the signal trace interconnect portion 822. Similar to the dielectric layer 408 in FIG. 4, the dielectric layer 508 in FIG. 5, and/or the dielectric layer 608 illustrated in FIG. 6, the dielectric layer 808 may also include at least a second area and a third area as described herein.

As previously discussed herein, the higher-speed signal pad slots and the lower-speed signal pad slots may be arranged in an alternating pattern within the signal pad region. As described herein at least with respect to FIG. 8, the higher-speed signal pad slots and the lower-speed signal pad slots may be grouped together. In some aspects, the signal pad region 814 may include one or more signal pad region slots 826. The one or more signal pad region slots 826 may include at least one signal pad region slot for a higher-speed signal pad. Additionally, or alternatively, the one or more signal pad region slots 826 may include at least one signal pad region slot for a lower-speed signal pad.

For example, as shown in FIG. 8, the one or more signal pad region slots 826 may include a first higher-speed signal pad slot 826*a*, a second higher-speed signal pad slot 826*b*, a third higher-speed signal pad slot 826*c*, a fourth higher-speed signal pad slot 826*d*, a fifth higher-speed signal pad slot 826*e*, and a sixth higher-speed signal pad slot 826*f*. Each of the first higher-speed signal pad slot 826*a*, the second higher-speed signal pad slot 826*b*, the third higher-speed signal pad slot 826*c*, the fourth higher-speed signal pad slot 826*d*, the fifth higher-speed signal pad slot 826*e*, and the sixth higher-speed signal pad slot 826*f* may include a higher-speed signal pad as described herein. Additionally, in some aspects, the one or more signal pad region slots 826 may include a first lower-speed signal pad slot 826*g*, a second lower-speed signal pad slot 826*h*, a third lower-speed signal pad slot 826*i*, a fourth lower-speed signal pad slot 826*j*, a fifth lower-speed signal pad slot 826*k*, and a sixth lower-speed signal pad slot 826*l*. Each of the first lower-speed signal pad slot 826*g*, the second lower-speed signal pad slot 826*h*, the third lower-speed signal pad slot 826*i*, the fourth lower-speed signal pad slot 826*j*, the fifth lower-speed signal pad slot 826*k*, and the sixth lower-speed signal pad slot 826*l* may include a lower-speed signal pad as described herein. As shown in FIG. 8, the higher-speed signal pad slots and the lower-speed signal pad slots may be grouped together within the signal pad region 814.

As shown in FIG. 8, the indented section 825*a* of the base layer 802 beneath the first area 824 may be vertically aligned with the first higher-speed signal pad slot 826*a*, the second higher-speed signal pad slot 826*b*, the third higher-speed signal pad slot 826*c*, the fourth higher-speed signal pad slot 826*d*, the fifth higher-speed signal pad slot 826*e*, and the sixth higher-speed signal pad slot 826*f* of the signal pad region 814 grouped together. Similarly, the thicker section 825*b* of the base layer 802 beneath the first area 824 may be vertically aligned with the first lower-speed signal pad slot 826*g*, the second lower-speed signal pad slot 826*h*, the third lower-speed signal pad slot 826*i*, the fourth lower-speed signal pad slot 826*j*, the fifth lower-speed signal pad slot 826*k*, and the sixth lower-speed signal pad slot 826*l* grouped together.

When a distance between one or more higher-speed signal pads and a base layer and a distance between one or more signal traces associated with the one or more higher-speed signal pads and the base layer is substantially similar (e.g., a same distance), the impedance at the one or more signal traces associated with the one or more higher-speed signal pads may be greater than the impedance at the higher-speed signal pad region slots creating channel return loss and less signal integrity. Conversely, if a base layer has varying heights such that, for example, a first height of the base layer beneath one or more higher-speed signal pad region slots (e.g., one or more higher-speed signal pads) is less than a height of the base layer beneath a cover layer (e.g., one or more signal traces associated with the one or more higher-speed signal pads), a distance between the higher-speed signal pad region slots and the base layer that is greater than a distance between the one or more signal traces associated with the higher-speed signal pad region slots and the base layer may increase the impedance of the higher-speed signal pads to better match a target channel impedance (e.g., an impedance at the higher-speed signal traces) enabling time domain reflectometry (TDR) improvements. Better matching pad impedance to the channel impedance may help reduce channel return loss. Reducing channel return loss may improve signal integrity. Improving signal integrity may enable a higher bandwidth for the channel. Furthermore, improving signal integrity may help reduce system power consumption, e.g., by reducing signal/power transmitter swing and/or optimizing signal/power receiver equalization needs.

Similarly, when a distance between one or more lower-speed signal pads and a base layer and a distance between one or more signal traces associated with the one or more lower-speed signal pads and the base layer is substantially similar (e.g., a same distance), the impedance at the one or more signal traces associated with the one or more lower-speed signal pads may be greater than the impedance at the lower-speed signal pad region slots creating channel return loss and less signal integrity. Conversely, if a base layer has varying heights such that, for example, a second height of the base layer beneath one or more lower-speed signal pad region slots (e.g., one or more lower-speed signal pads) is less than a height of the base layer beneath a cover layer (e.g., one or more signal traces associated with the one or more lower-speed signal pads), a distance between the lower-speed signal pad region slots and the base layer that is greater than a distance between the one or more signal traces associated with the lower-speed signal pad region slots may increase the impedance of the lower-speed signal pads to better match a target channel impedance (e.g., an impedance at the lower-speed signal traces) enabling time domain reflectometry (TDR) improvements. Better matching pad impedance to the channel impedance may help reduce channel return loss. Reducing channel return loss may improve signal integrity. Improving signal integrity may enable a higher bandwidth for the channel. Furthermore, improving signal integrity may help reduce system power consumption, e.g., by reducing signal/power transmitter swing and/or optimizing signal/power receiver equalization needs.

It should be understood that an impedance difference between the impedance from the higher-speed signal pads to the base layer and the impedance from the signal traces associated with the higher-speed signal pads to the base layer may be greater than an impedance difference between the impedance from the lower-speed signal pads to the base layer and the impedance from signal traces associated with the higher-speed signal pads to the base layer. Thus, in order to match impedances associated with higher-speed signal pads, signal traces associated with the higher-speed signal pads, lower-speed signal pads, and signal traces associated with lower-speed signal pads, the distance between the lower-speed signal pads and the base layer may be greater than a distance between the signal traces associated with the lower-speed signal pad and the base layer and a distance between the signal traces associated with the higher-speed signal pads and the base layer, but less than a distance between the higher-speed signal pads and the base layer. In some aspects, the distance between the lower-speed signal pads and the base layer may less than the distance between the higher-speed signal pads and the base layer, but equal to the distance between the signal traces associated with the higher-speed signal traces and/or equal to the distance between the signal traces associated with the lower-speed signal pads and the base layer.

As described herein, one or more signal pad regions may be constrained to a relatively large size of width and/or length by the type of process(es) used for attaching the flexure with other component(s). Non-limiting examples of attachment processes may include an ACF bonding process, an SMT attachment process, and/or a hot bar bonding process, etc. The large size of the one or more signal pad regions and/or one or more signal pads of the one or more signal pad regions may cause the one or more signal pad regions and/or the one or more signal pads of the one or more signal pad regions to have a relatively low impedance which may result in poor channel performance for electrical signals (e.g., higher-speed signals) when there is a mismatch between the impedance of the one or more signal pad regions and/or the one or more signal pads of the one or more signal pad regions and the corresponding signal channel(s) (e.g., the electrical signal trace(s) formed by the conductive layer).

Figure 9:
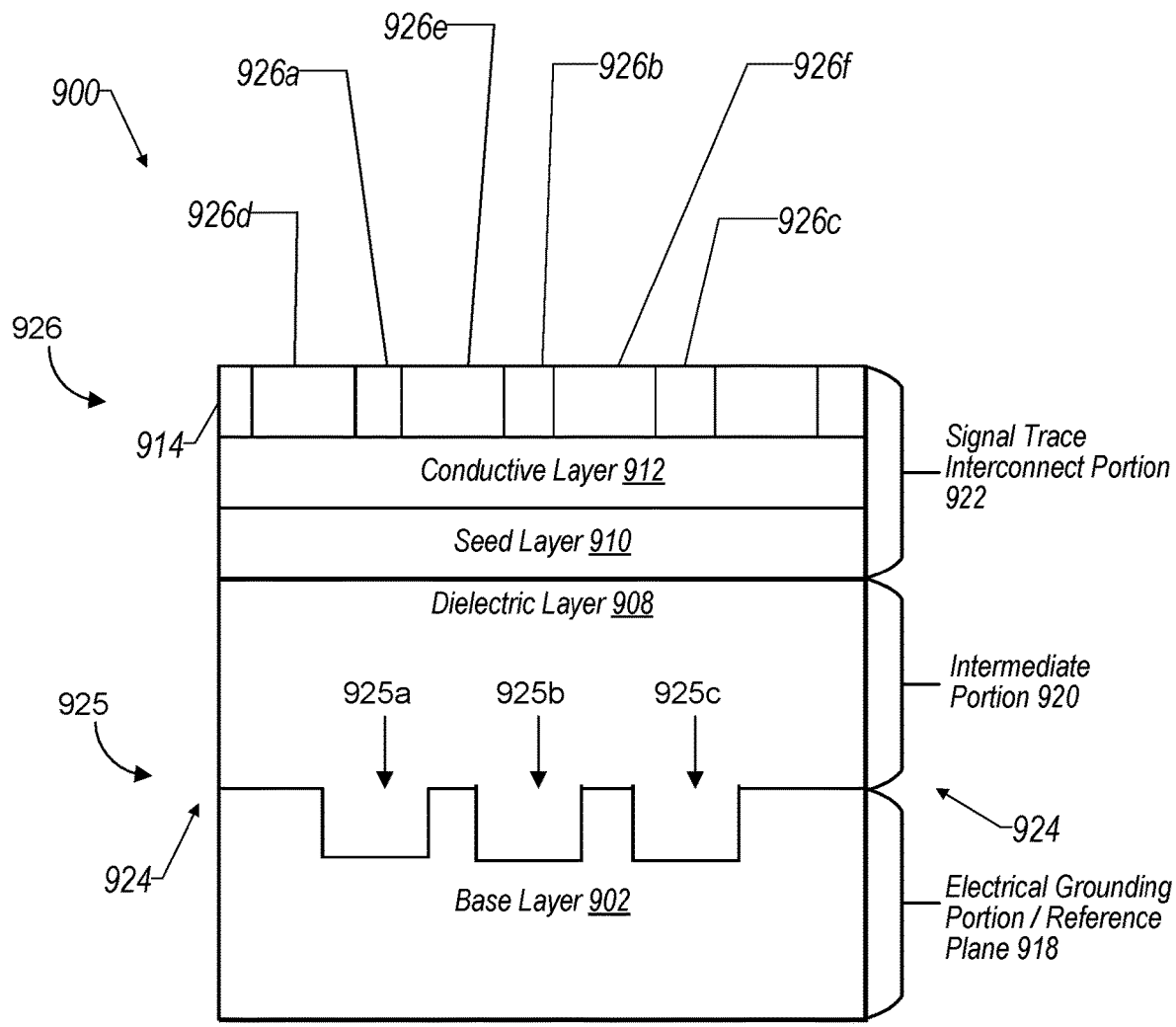
FIG. 9 illustrates a schematic diagram of yet another example sensor shift flexure arrangement for improved signal routing according to some aspects.

FIG. 9 illustrates a schematic diagram of another example sensor shift flexure arrangement 900 for improved signal routing according to some aspects. The sensor shift flexure arrangement 900 may include one or more same or similar features as camera system 100 of FIG. 1, the sensor shift flexure 106 of FIG. 2, the camera 300a of FIG. 3A, the camera 300b of FIG. 3B, the sensor shift flexure arrangement 400 of FIG. 4, the sensor shift flexure arrangement 500 of FIG. 5, the sensor shift flexure arrangement 600 of FIG. 6. For example, the sensor shift flexure arrangement 900 may include a base layer 902, a dielectric layer 908, a seed layer 910, a conductive layer 912, and a signal pad region 914. The sensor shift flexure arrangement 900 may also include an electrical grounding portion/reference plane 918 having at least the base layer 902, an intermediate portion 920 having at least the dielectric layer 908, and/or a signal trace interconnect portion 922 having at least the conductive layer 912 and the signal pad region 914. As shown in FIG. 9, the signal trace interconnect portion 922 may include at least a first area 924. Similar to the signal trace interconnect portion 422 in FIG. 4, the signal trace interconnect portion 522 in FIG. 5, the signal trace interconnect portion 622 illustrated in FIG. 6, and/or the signal trace interconnect portion 722 of FIG. 7, the signal trace interconnect portion 922 may also include at least a second area and/or a third area as described herein.

Also, as shown in FIG. 9, the base layer 902 may have different heights beneath the first area 924 varying the distance between the first signal pad region 926 and the base layer 902. For example, a first indented section 925a, a second indented section 925b, and a third indented section 925c each of the base layer 902 beneath the first area 924 may provide a greater distance between the signal pad region 914 and the base layer 902 than other sections of the base layer 902 beneath the first area 924. In some aspects, the signal pad region 914 may include one or more signal pad region slots 926. The one or more signal pad region slots 926 may include at least one signal pad region slot for a higher-speed signal pad. For example, as shown in FIG. 9, the one or more signal pad region slots 926 may include a first higher-speed signal pad slot 926a, a second higher-speed signal pad slot 926b, and a third higher-speed signal pad slot 926c. Each of the first higher-speed signal pad slot 926a, the second higher-speed signal pad slot 926b, and the third higher-speed signal pad slot 926c may include a higher-speed signal pad as described herein.

Additionally, or alternatively, the one or more signal pad region slots 926 may include at least one signal pad region slot for a lower-speed signal pad. For example, the one or more signal pad region slots 926 may include a first lower-speed signal pad slot 926d, a second lower-speed signal pad slot 926e, and a third lower-speed signal pad slot 926f. Each of the first lower-speed signal pad slot 926d, the second lower-speed signal pad slot 926e, and the third lower-speed signal pad slot 926f may include a lower-speed signal pad as described herein. The higher-speed signal pad slots and the lower-speed signal pad slots are arranged in an alternating pattern within the signal pad region 914. As described further here, the higher-speed signal pad slots and the lower-speed signal pad slots may be grouped together, as described further herein, and/or may be arranged in an alternating group pattern within the signal pad region 914. In some aspects, the higher-speed signal pad slots and the lower-speed signal pad slots may be arranged randomly or according to one or more specified arrangements.

As shown in FIG. 9, the first indented section 925a, the second indented section 925b, the third indented section 925c may be vertically aligned with the first higher-speed signal pad slot 926a, the second higher-speed signal pad slot 926b, and the third higher-speed signal pad slot 926c, respectively. Similarly, remaining extended sections of the base layer 902 beneath the first area 924 may be vertically aligned with the first lower-speed signal pad slot 926d, the second lower-speed signal pad slot 926e, and the third lower-speed signal pad slot 926f.

When a distance between one or more higher-speed signal pads and a base layer and a distance between one or more signal traces associated with the one or more higher-speed signal pads and the base layer is substantially similar (e.g., a same distance), the impedance at the one or more signal traces associated with the one or more higher-speed signal pads may be greater than the impedance at the higher-speed signal pad region slots creating channel return loss and less signal integrity. Conversely, if a base layer has varying heights such that, for example, a first height of the base layer beneath one or more higher-speed signal pad region slots (e.g., one or more higher-speed signal pads) is less than a height of the base layer beneath a cover layer (e.g., one or more signal traces associated with the one or more higher-speed signal pads), a distance between the higher-speed signal pad region slots and the base layer that is greater than a distance between the one or more signal traces associated with the higher-speed signal pad region slots may increase the impedance of the higher-speed signal pads to better match a target channel impedance (e.g., an impedance at the higher-speed signal traces) enabling time domain reflectometry (TDR) improvements. Better matching pad impedance to the channel impedance may help reduce channel return loss. Reducing channel return loss may improve signal integrity. Improving signal integrity may enable a higher bandwidth for the channel. Furthermore, improving signal integrity may help reduce system power consumption, e.g., by reducing signal/power transmitter swing and/or optimizing signal/power receiver equalization needs.

Similarly, when a distance between one or more lower-speed signal pads and a base layer and a distance between one or more signal traces associated with the one or more lower-speed signal pads and the base layer is substantially similar (e.g., a same distance), the impedance at the one or more signal traces associated with the one or more lower-speed signal pads may be greater than the impedance at the lower-speed signal pad region slots creating channel return loss and less signal integrity. Conversely, if a base layer has varying heights such that, for example, a second height of the base layer beneath one or more lower-speed signal pad region slots (e.g., one or more lower-speed signal pads) is less than a height of the base layer beneath a cover layer (e.g., one or more signal traces associated with the one or more lower-speed signal pads), a distance between the lower-speed signal pad region slots and the base layer that is greater than a distance between the one or more signal traces associated with the lower-speed signal pad region slots may increase the impedance of the lower-speed signal pads to better match a target channel impedance (e.g., an impedance at the lower-speed signal traces) enabling time domain reflectometry (TDR) improvements. Better matching pad impedance to the channel impedance may help reduce channel return loss. Reducing channel return loss may improve signal integrity. Improving signal integrity may enable a higher bandwidth for the channel. Furthermore, improving signal integrity may help reduce system power consumption, e.g., by reducing signal/power transmitter swing and/or optimizing signal/power receiver equalization needs.

It should be understood that an impedance difference between the impedance from the higher-speed signal pads to the base layer and the impedance from the signal traces associated with the higher-speed signal pads to the base layer may be greater than an impedance difference between the impedance from the lower-speed signal pads to the base layer and the impedance from signal traces associated with the higher-speed signal pads to the base layer. Thus, in order to match impedances associated with higher-speed signal pads, signal traces associated with the higher-speed signal pads, lower-speed signal pads, and signal traces associated with lower-speed signal pads, the distance between the lower-speed signal pads and the base layer may be greater than a distance between the signal traces associated with the lower-speed signal pad and the base layer and a distance between the signal traces associated with the higher-speed signal pads and the base layer, but less than a distance between the higher-speed signal pads and the base layer. In some aspects, the distance between the lower-speed signal pads and the base layer may less than the distance between the higher-speed signal pads and the base layer, but equal to the distance between the signal traces associated with the higher-speed signal traces and/or equal to the distance between the signal traces associated with the lower-speed signal pads and the base layer.

Additionally, or alternatively, the one or more signal pad region slots 926 may include at least one signal pad region slot for a higher-speed signal pad that has a smaller area (e.g., a lesser length and/or a lesser width) than at least one signal pad region slot for a lower-speed signal pad. For example, as shown in FIG. 9, the first higher-speed signal pad slot 926*a*, the second higher-speed signal pad slot 926*b*, and the third higher-speed signal pad slot 926*c* may each comprise a smaller area than the first lower-speed signal pad slot 926*d*, the second lower-speed signal pad slot 926*e*, and the third lower-speed signal pad slot 926*f*. The reduced size of the one or more signal pad region slots for the higher-speed signal pads, for example, compared to the one or more signal pad region slots for the lower-speed signal pads, may increase the impedance at the one or more signal pad region slots for the higher-speed signal pads and may result in improved channel performance for electrical signals (e.g., higher-speed signals) when there is a match between the impedance of the one or more signal pad regions for the higher-speed signal pads and/or the one or more signal pads of the one or more signal pad regions for the higher-speed signal pads and the corresponding signal channel(s) (e.g., the electrical signal trace(s) formed by the conductive layer).

Figure 10A:
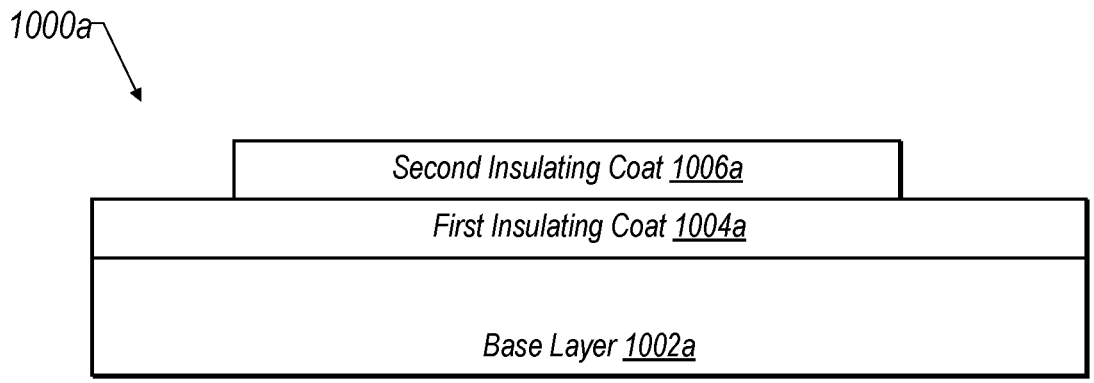
FIG. 10a illustrates a cross-sectional diagram of a shift flexure arrangement for improved signal routing according to some aspects.

FIG. 10*a* illustrates a cross-sectional diagram of a shift flexure arrangement 1000*a* for improved signal routing according to some aspects. The sensor shift flexure arrangement 1000*a* may include one or more same or similar features as camera system 100 of FIG. 1, the sensor shift flexure 106 of FIG. 2, the camera 300*a* of FIG. 3A, the camera 300*b* of FIG. 3B, the sensor shift flexure arrangement 400 of FIG. 4, the sensor shift flexure arrangement 500 of FIG. 5, the sensor shift flexure arrangement 600 of FIG. 6, the sensor shift flexure arrangement 700 of FIG. 7, the sensor shift flexure arrangement 800 of FIG. 8, and/or the sensor shift flexure arrangement 900 of FIG. 9. The sensor shift flexure arrangement 1000*a* may illustrate a structure of an insulating layer (e.g., a dielectric layer) and an insulating layer's application to a base layer. For example, the sensor shift flexure arrangement 1000*a* may include a base layer 1002*a*, a first insulating coat 1004*a*, and a second insulating coat 1006*a*. As shown in FIG. 10*a*, a first insulating coat 1004*a* may be applied relatively uniformly on and across a relatively flat top surface of the base layer 1002*a*. After curing, for example, the second insulating coat 1006*a* may be applied relatively uniformly on and across a portion of a top surface of the cured first insulating coat 1004*a*. After the second insulating coat 1006*a* cures, the first insulating coating 1004*a* and the second insulating coat 1006*a* may form an insulating layer such as the dielectric layer 408 illustrated in FIG. 4, the dielectric layer 508 illustrated in FIG. 5, the dielectric layer 608 illustrated in FIG. 6, the dielectric layer 708 illustrated in FIG. 7, the dielectric layer 808 illustrated in FIG. 8, and/or the dielectric layer 908 illustrated in FIG. 9.

Figure 10B:
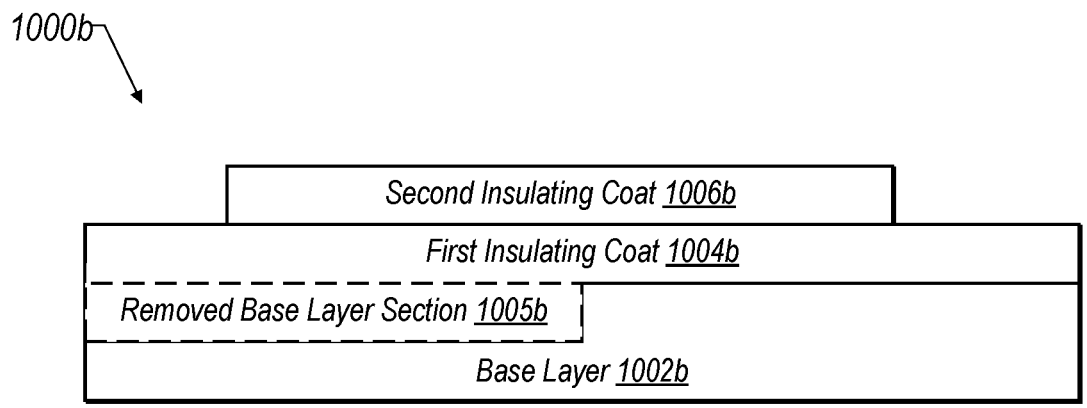
FIG. 10b illustrates a cross-sectional diagram of another shift flexure arrangement for improved signal routing according to some aspects.

FIG. 10*b* illustrates a cross-sectional diagram of another shift flexure arrangement 1000*b* for improved signal routing according to some aspects. The sensor shift flexure arrangement 1000*b* may include one or more same or similar features as camera system 100 of FIG. 1, the sensor shift flexure 106 of FIG. 2, the camera 300*a* of FIG. 3A, the camera 300*b* of FIG. 3B, the sensor shift flexure arrangement 400 of FIG. 4, the sensor shift flexure arrangement 500 of FIG. 5, the sensor shift flexure arrangement 600 of FIG. 6, the sensor shift flexure arrangement 700 of FIG. 7, the sensor shift flexure arrangement 800 of FIG. 8, the sensor shift flexure arrangement 900 of FIG. 9, and/or the sensor shift flexure arrangement 1000*a* of FIG. 10*a*. The sensor shift flexure arrangement 1000*b* may illustrate another structure of an insulating layer (e.g., a dielectric layer) and an insulating layer's application to a base layer. For example, the sensor shift flexure arrangement 1000*b* may include a base layer 1002*b*, a first insulating coat 1004*b*, and a second insulating coat 1006*b*. As shown in FIG. 10*b*, a section of the base layer 1002*b* may be removed forming a removed base layer section 1005*b*. The removed base layer section 1005*b* may be removed by etching the base layer 1002*b*, for example. Subsequently, the first insulating coat 1004*b* may be applied to a top surface of the base layer 1002*b*. The first insulating coat 1004*b* may fill the removed base layer section 1005*b*. The first insulating coat 1004*b* may form a relatively flat top surface (e.g., opposite the base layer 1002*b*) so that the first insulating coat 1004*a* has a greater depth or thickness over the area of the removed base layer section 1005*b* compared to the portion of the base layer 1002*a* that does not have a removed section. After curing, for example, the second insulating coat 1006*b* may be applied relatively uniformly on and across a portion of a top surface of the cured first insulating coat 1004b. After the second insulating coat 1006b cures, the first insulating coating 1004b and the second insulating coat 1006b may form an insulating layer such as the dielectric layer 408 illustrated in FIG. 4, the dielectric layer 508 illustrated in FIG. 5, the dielectric layer 608 illustrated in FIG. 6, the dielectric layer 708 illustrated in FIG. 7, the dielectric layer 808 illustrated in FIG. 8, and/or the dielectric layer 908 illustrated in FIG. 9. The portion of the insulating layer that has a relatively greater depth or thickness may be used to adjust an impedance at a signal pad region or at one or more signal pads to match an impedance at one or more signal traces as described herein.

Figure 10C:
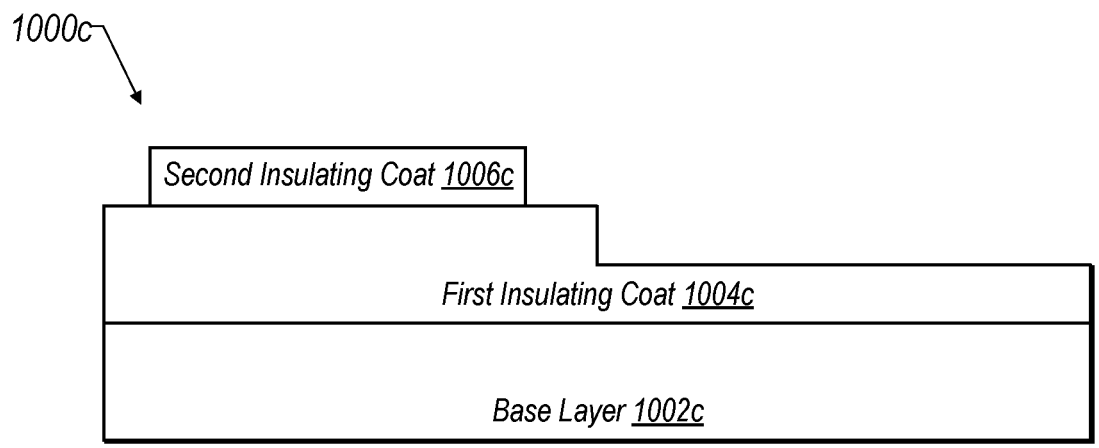
FIG. 10c illustrates a cross-sectional diagram of yet another shift flexure arrangement for improved signal routing according to some aspects.

FIG. 10c illustrates a cross-sectional diagram of yet another shift flexure arrangement 1000c for improved signal routing according to some aspects. The sensor shift flexure arrangement 1000c may include one or more same or similar features as camera system 100 of FIG. 1, the sensor shift flexure 106 of FIG. 2, the camera 300a of FIG. 3A, the camera 300b of FIG. 3B, the sensor shift flexure arrangement 400 of FIG. 4, the sensor shift flexure arrangement 500 of FIG. 5, the sensor shift flexure arrangement 600 of FIG. 6, the sensor shift flexure arrangement 700 of FIG. 7, the sensor shift flexure arrangement 800 of FIG. 8, the sensor shift flexure arrangement 900 of FIG. 9, the sensor shift flexure arrangement 1000a of FIG. 10a, and/or the sensor shift flexure arrangement 1000b of FIG. 10b. The sensor shift flexure arrangement 1000c may illustrate yet another structure of an insulating layer (e.g., a dielectric layer) and an insulating layer's application to a base layer. For example, the sensor shift flexure arrangement 1000c may include a base layer 1002c, a first insulating coat 1004c, and a second insulating coat 1006c. As shown in FIG. 10c, the first insulating coat 1004c may be applied to a top surface of the base layer 1002c. The first insulating coat 1004c may not be applied uniformly across the top surface of the base layer 1002c. For example, as shown in FIG. 10c, a portion of the first insulating coat 1004c may have a greater height from the base layer 1002c compared to another portion of the first insulating coat 1004c. The first insulating coat 1004c may form multiple top surfaces (e.g., opposite the Stojakovic base layer 1002c) having varying heights and so that the first insulating coat 1004c has a greater depth or thickness over one or more areas with greater heights compared to one or more portions of the first insulating coat 1004c having lesser heights. In some aspects, the first insulating coat 1004c may be applied in multiple steps. For example, a first application of the first insulating coat 1004c may be formed across an entire top surface of the base layer 1002c having a uniform depth or thickness. Subsequently, a second application of the first insulating coat 1004c may be formed across a portion of the top surface of the first application creating a greater height or thickness of the first insulating coat 1004c at the second application site. After curing, for example, the second insulating coat 1006c may be applied relatively uniformly on and across a portion of a top surface of the cured first insulating coat 1004c having a greater or greatest height. After the second insulating coat 1006c cures, the first insulating coating 1004c and the second insulating coat 1006c may form an insulating layer such as the dielectric layer 408 illustrated in FIG. 4, the dielectric layer 508 illustrated in FIG. 5, the dielectric layer 608 illustrated in FIG. 6, the dielectric layer 708 illustrated in FIG. 7, the dielectric layer 808 illustrated in FIG. 8, and/or the dielectric layer 908 illustrated in FIG. 9. The portion of the insulating layer that has a relatively greater height or thickness may be used to adjust an impedance at a signal pad region or at one or more signal pads to match an impedance at one or more signal traces as described herein.

Figure 11:
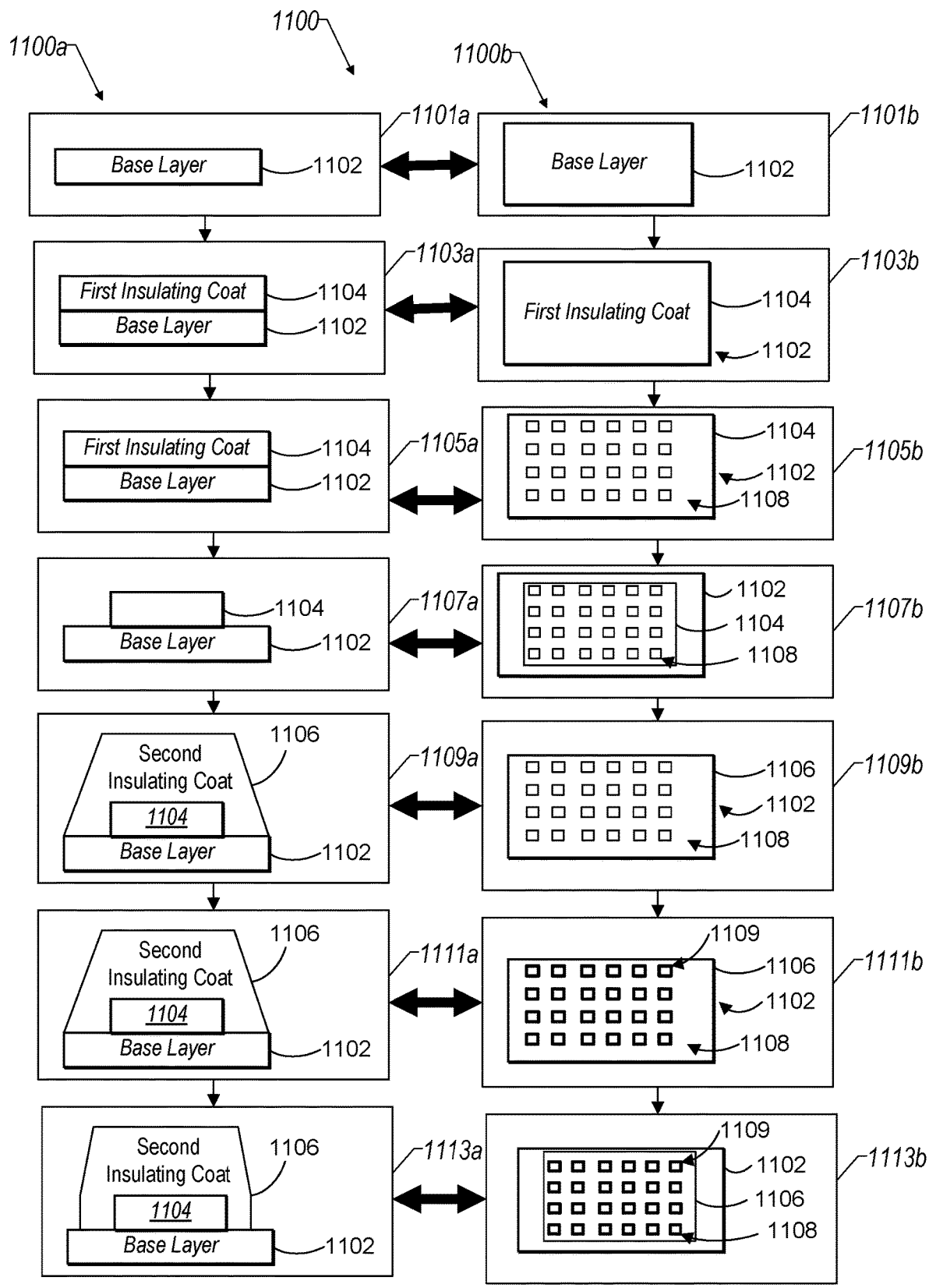
FIG. 11 illustrates an example process of manufacturing a flexure for improved signal routing according to some aspects.
Figure 12:
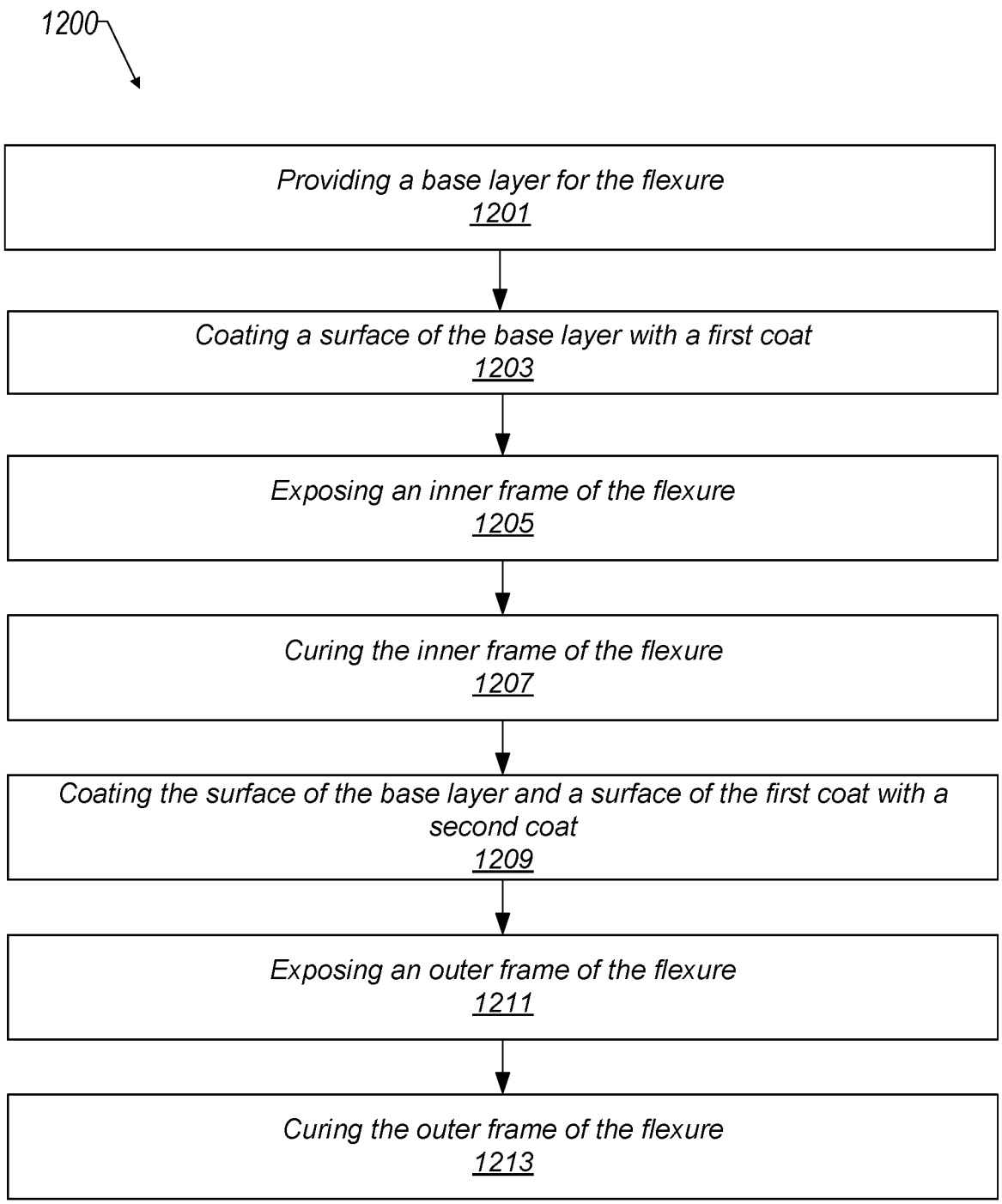
FIG. 12 illustrated an example method of manufacturing a flexure for improved signal routing according to some aspects.

FIG. 11 illustrates an example process 1100 of manufacturing a flexure for improved signal routing according to some aspects. The process 1100 of manufacturing the flexure for improved signal routing is provided from both a side view perspective 1100a of the flexure and a top view perspective 1100b of the flexure. FIG. 12 illustrates an example method 1200 of manufacturing a flexure for improved signal routing according to some aspects. The method 1200 of manufacturing the flexure illustrated in FIG. 12 aligns with the process 1100 of manufacturing the flexure illustrated in FIG. 11. The flexure manufactured using the process 1100 and/or the method 1200 may include one or more same or similar features as camera system 100 of FIG. 1, the sensor shift flexure 106 of FIG. 2, the camera 300a of FIG. 3A, the camera 300b of FIG. 3B, the sensor shift flexure arrangement 400 of FIG. 4, the sensor shift flexure arrangement 500 of FIG. 5, the sensor shift flexure arrangement 600 of FIG. 6, the sensor shift flexure arrangement 700 of FIG. 7, the sensor shift flexure arrangement 800 of FIG. 8, the sensor shift flexure arrangement 900 of FIG. 9, the sensor shift flexure arrangement 1000a of FIG. 10a, the sensor shift flexure arrangement 1000b of FIG. 10b, and/or the sensor shift flexure arrangement 1000c of FIG. 10c.

At step 1201, a base layer for a flexure may be provided. For example, as shown at block 1101a and 1101b in FIG. 11, a base layer 1102 may be provided for manufacturing a flexure as described herein. In some aspects, the base layer 1102 (e.g., a base alloy) may have a thickness of about 150 μm ($10^{-6}$ m) (microns). At step 1203, a top surface of the base layer may be coated with a first coat of an insulating material. For example, as shown at block 1103a and 1103b in FIG. 11, a first insulating coat 1104 may be applied to a top surface of the base layer 1102. In some aspects, the first insulating coat 1104 may cover an entire top surface of the base layer 1102. In some aspects, the first insulating coat 1104 may be a coat of polyimide (PI) (e.g., liquid PI), a hybrid-style PI and adhesive material provided as a laminated cover layer, and/or the like and may have a thickness of about 8 microns.

At step 1205, an inner frame of the flexure may be exposed. For example, as shown at block 1105a and 1105b in FIG. 11, an inner frame 1108 from the first insulating coat 1104 may be exposed. The inner frame 1108, in some aspects, may be formed using one or more lithography processes. At step 1207, the inner frame of the flexure may be developed and cured. For example, as shown at block 1107a and 1107b in FIG. 11, the first insulating coat 1104 at the exposed inner frame 1108 may be developed and cured exposing a perimeter of the top surface of the base layer 1102 to the ambient environment.

At step 1209, a second insulating coat is coated on to a top surface of the base layer and a top surface of the first insulating coat. For example, as shown at block 1109a and 1109b in FIG. 11, a second insulating coat 1106 is applied to the perimeter of the top surface of the base layer 1102 and to the top surface of the first insulating coat 1104. In some aspects, the second insulating coat 1106 may be a coat of polyimide (PI) (e.g., liquid PI), a hybrid-style PI and adhesive material provided as a laminated cover layer, and/or the like and may have a thickness of about 12 microns. At step 1211, an outer frame of the flexure may be exposed. For example, as shown at block 1111a and 1111b in FIG. 11, an outer frame 1109 from the first insulating coat 1104 and the second insulating coat 1106 may be exposed. The outer frame 1109, in some aspects, may be formed using one or more lithography processes. At step 1213, the outer frame of the flexure may be cured. For example, as shown at block 1113a and 1113b in FIG. 11, the outer frame 1109 may be developed and cured exposing a perimeter of the top surface of the base layer 1102 to the ambient environment. In some aspects, flexure arms (e.g., flexure arms 206 in FIG. 2) may also be developed and cured.

Figure 13:
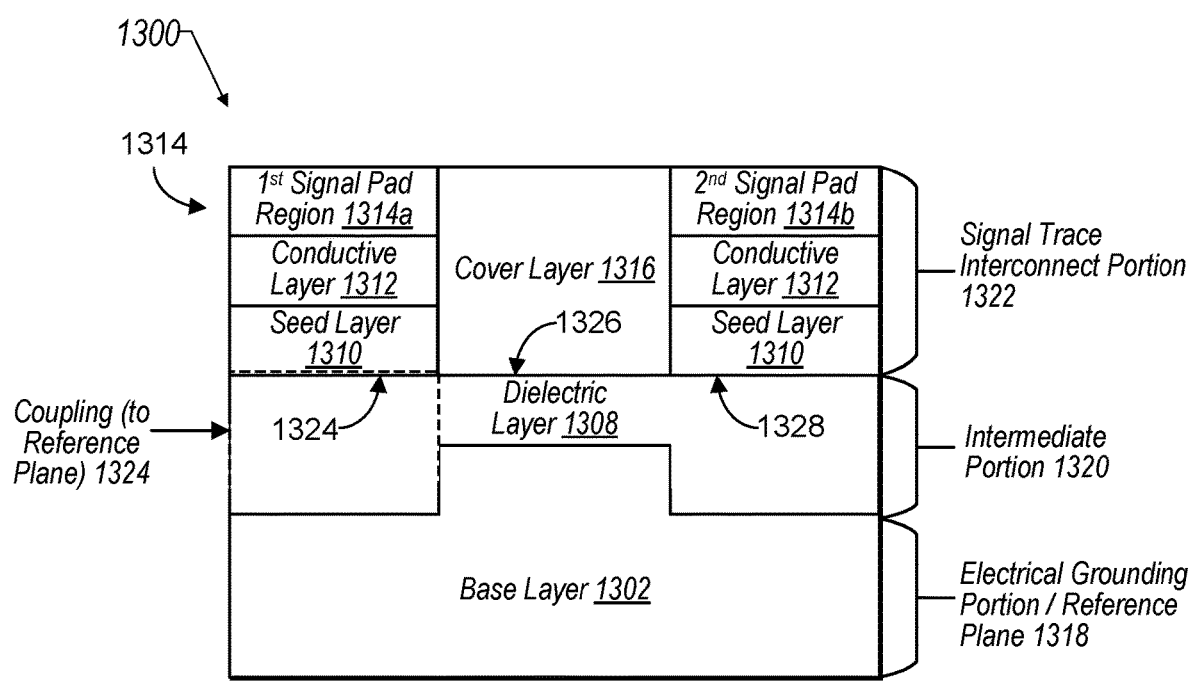
FIG. 13 illustrates a schematic diagram of an example sensor shift flexure arrangement for improved signal routing according to some aspects.

FIG. 13 illustrates a schematic diagram of an example sensor shift flexure arrangement 1300 for improved signal routing according to some aspects. The sensor shift flexure arrangement 1300 may include one or more same or similar features as camera system 100 of FIG. 1, the sensor shift flexure 106 of FIG. 2, the camera 300a of FIG. 3A, the camera 300b of FIG. 3B, the sensor shift flexure arrangement 400 of FIG. 4, the sensor shift flexure arrangement 500 of FIG. 5, the sensor shift flexure arrangement 600 of FIG. 6, the sensor shift flexure arrangement 700 of FIG. 7, the sensor shift flexure arrangement 800 of FIG. 8, the sensor shift flexure arrangement 900 of FIG. 9, the sensor shift flexure arrangement 1000a of FIG. 10a, the sensor shift flexure arrangement 1000b of FIG. 10b, the sensor shift flexure arrangement 1000c of FIG. 10c, and/or the flexure shift flexure arrangement described with respect to FIG. 11 and FIG. 12. For example, the sensor shift flexure arrangement 1300 may include a base layer 1302, a dielectric layer 1308, a seed layer 1310, a conductive layer 1312, one or more signal pad regions 1314 including a first signal pad region 1314a and a second signal pad region 1314b, a cover layer 1316. The sensor shift flexure arrangement 1300 may also include an electrical grounding portion/reference plane 1318 having at least the base layer 1302, an intermediate portion 1320 having at least the adhesion layer 1306 and the dielectric layer 1308, and/or a signal trace interconnect portion 1322 having at least the seed layer 1310, the conductive layer 1312, the one or more signal pad regions 1314, and the cover layer 1316.

As shown in FIG. 13, the signal trace interconnect portion 1322 may include at least a first area 1324 and a second area 1326. The first area 1324 may be a surface of the signal trace interconnect portion 1322 that is adjacent (e.g., abutting, next to) at least a portion of the dielectric layer 1308. For example, as shown in FIG. 13, the first area 1324 may be aligned with a portion of the first signal pad region 1314a. The second area 1326 may be another surface of the signal trace interconnect portion 1322 that is adjacent (e.g., abutting, next to) at least another portion of the dielectric layer 1308. For example, as shown in FIG. 13, the second area 1326 may be aligned with and/or adjacent at least a portion of the cover layer 1316. Additionally, or alternatively, the second area 1326 may be adjacent one or more electrical traces (e.g., electrical traces 216 illustrated in FIG. 2).

In some aspects, the first area 1324 may be beneath (e.g., aligned with) at least a portion of the first signal pad region 1314a. For example, the first area 1324 may be beneath the first signal pad region 1314a and positioned along an axis that is perpendicular to the first area 1324 and intersects with the first signal pad region 1314a. In some aspects, the first area 1324 may be beneath the entire first signal pad region 1314a. Additionally, or alternatively, the first area 1324 may be beneath one or more signal pads disposed on and/or in the first signal pad region 1314a and/or not beneath a remainder of the first signal pad region 1314a.

The second area 1326 may be beneath (e.g., aligned with) at least a portion of the cover layer 1316. For example, the second area 1326 may be beneath the cover layer 1316 and positioned along an axis that is perpendicular to the second area 1326 and intersects with the cover layer 1316. In some aspects, the cover layer 1316 may be beneath one or more electrical traces (e.g., electrical traces 216 illustrated in FIG. 2) routed on an inner frame (e.g., the inner frame 202 illustrated in FIG. 2), one or more flexure arms (e.g., flexure arm(s) 206 illustrated in FIG. 2), and/or an outer frame (e.g., the outer frame 204 illustrated in FIG. 2) and/or not beneath a remainder of the cover layer 1316. For example, the second area 1326 may be beneath one or more signal traces aligned with the cover layer 1316. As indicated in FIG. 13, the signal trace interconnect portion 1322 of the sensor shift flexure arrangement 1300 may have a relatively large amount of coupling 1324 (e.g., a large width), via the intermediate portion 1320, to electrical grounding portion/reference plane 1318.

Figure 14:
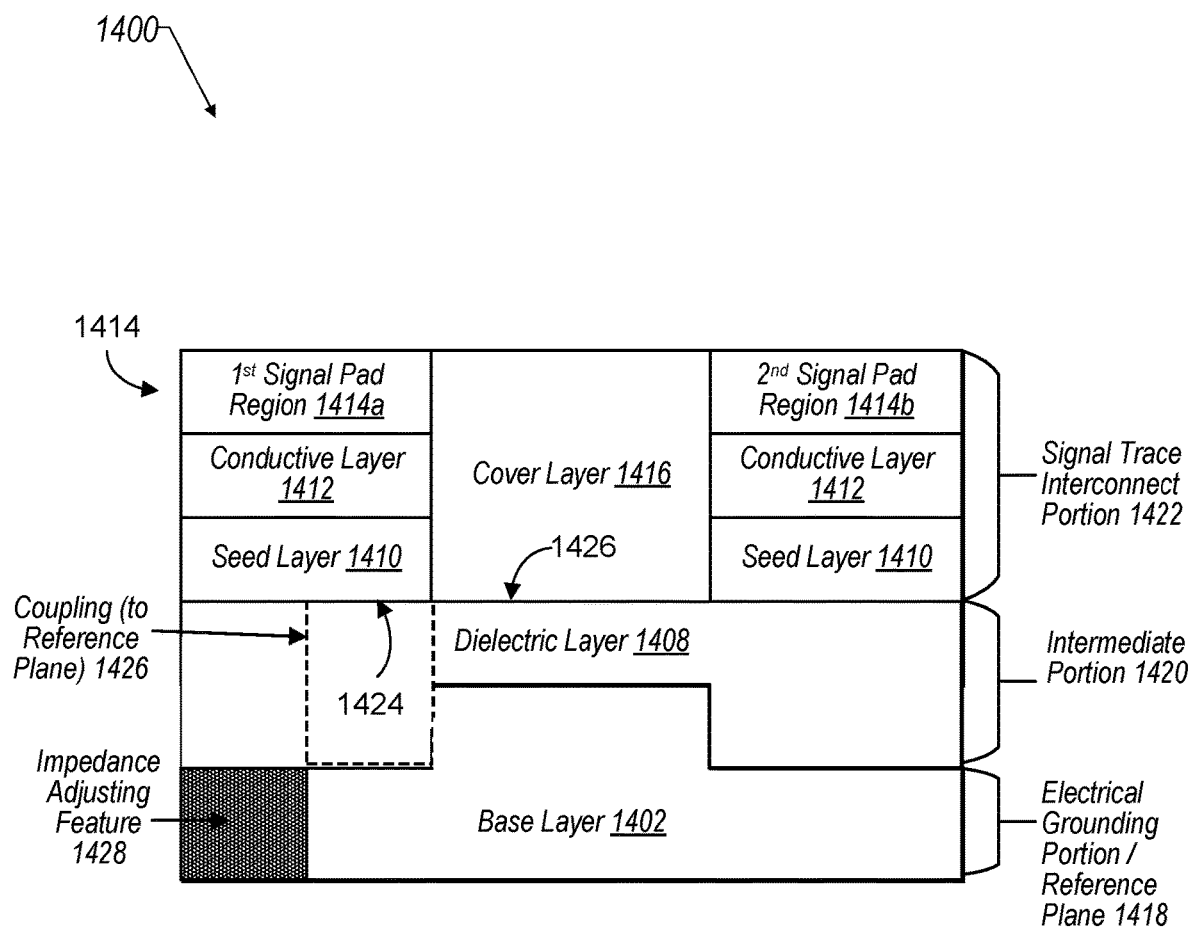
FIG. 14 illustrates a schematic diagram of an example sensor shift flexure arrangement including an impedance adjusting feature for improved signal routing according to some aspects.

FIG. 14 illustrates a schematic diagram of an example sensor shift flexure arrangement 1400 including an impedance adjusting feature for improved signal routing according to some aspects. The sensor shift flexure arrangement 1400 may include one or more same or similar features as camera system 100 of FIG. 1, the sensor shift flexure 106 of FIG. 2, the camera 300a of FIG. 3A, the camera 300b of FIG. 3B, the sensor shift flexure arrangement 400 of FIG. 4, the sensor shift flexure arrangement 500 of FIG. 5, the sensor shift flexure arrangement 600 of FIG. 6, the sensor shift flexure arrangement 700 of FIG. 7, the sensor shift flexure arrangement 800 of FIG. 8, the sensor shift flexure arrangement 900 of FIG. 9, the sensor shift flexure arrangement 1000a of FIG. 10a, the sensor shift flexure arrangement 1000b of FIG. 10b, the sensor shift flexure arrangement 1000c of FIG. 10c, and/or the flexure shift flexure arrangement described with respect to FIG. 11 and FIG. 12. For example, the sensor shift flexure arrangement 1400 may include a base layer 1402, an adhesion layer 1406, a dielectric layer 1408, a seed layer 1410, a conductive layer 1412, one or more signal pad regions 1414 including a first signal pad region 1414a and a second signal pad region 1414b, a cover layer 1416. The sensor shift flexure arrangement 1400 may also include an electrical grounding portion/reference plane 1418 having at least the base layer 1402, an intermediate portion 1420 having at least the adhesion layer 1406 and the dielectric layer 1408, and/or a signal trace interconnect portion 1422 having at least the seed layer 1410, the conductive layer 1412, the one or more signal pad regions 1414, and the cover layer 1416.

As shown in FIG. 14, the signal trace interconnect portion 1422 may include at least a first area 1424 and a second area 1426. The first area 1424 may be a surface of the signal trace interconnect portion 1422 that is adjacent (e.g., abutting, next to) at least a portion of the dielectric layer 1408. For example, as shown in FIG. 14, the first area 1424 may be adjacent or aligned with at least a portion of the first signal pad region 1414a. The second area 1426 may be another surface of the signal trace interconnect portion 1422 that is adjacent (e.g., abutting, next to) at least another portion of the dielectric layer 1408. For example, as shown in FIG. 14, the second area 1426 may be adjacent or aligned with at least a portion of the cover layer 1416. Additionally, or alternatively, the second area 1426 may be adjacent one or more electrical traces (e.g., electrical traces 216 illustrated in FIG. 2).

In some aspects, the first area 1424 may be beneath (e.g., aligned with) at least a portion of the first signal pad region 1414a. For example, the first area 1424 may be beneath the first signal pad region 1414a and positioned along an axis that is perpendicular to the first area 1424 and intersects with the first signal pad region 1414a. In some aspects, the first area 1424 may be beneath the entire first signal pad region 1414*a*. Additionally, or alternatively, the first area 1424 may be beneath one or more signal pads disposed on and/or in the first signal pad region 1414*a* and/or not beneath a remainder of the first signal pad region 1414*a*.

The second area 1426 may be beneath (e.g., aligned with) at least a portion of the cover layer 1416. For example, the second area 1426 may be beneath the cover layer 1416 and positioned along an axis that is perpendicular to the second area 1426 and intersects with the cover layer 1416. In some aspects, the cover layer 1416 may be beneath one or more electrical traces (e.g., electrical traces 216 illustrated in FIG. 2) routed on an inner frame (e.g., the inner frame 202 illustrated in FIG. 2), one or more flexure arms (e.g., flexure arm(s) 206 illustrated in FIG. 2), and/or an outer frame (e.g., the outer frame 204 illustrated in FIG. 2) and/or not beneath a remainder of the cover layer 1416. For example, the second area 1426 may be beneath one or more signal traces aligned with the cover layer 1416.

As shown in FIG. 14, the sensor shift flexure arrangement 1400 may include an impedance adjusting feature 1428. As indicated in FIG. 13, the signal trace interconnect portion 1322 of the sensor shift flexure arrangement 1300 may have a relatively large amount of coupling 1324, via the intermediate portion 1320, to electrical grounding portion/reference plane 1318. By comparison, as indicated in FIG. 14, the signal trace interconnect portion 1422 of the sensor shift flexure arrangement 1400 may have a relatively smaller amount of coupling 1426, via the intermediate portion 1420, to electrical grounding portion/reference plane 1418. The smaller amount of coupling 1426 in the sensor shift flexure arrangement 1400 may be achieved by including one or more impedance adjusting features (e.g., impedance adjusting feature 1428) in the electrical grounding portion/reference plane 1418. The impedance adjusting feature 1428, for example, may be designed to reduce the amount of coupling and thereby increase the impedance of the first signal pad region 1414*a* to better match the target channel impedance, thereby enabling time domain reflectometry (TDR) improvements. The impedance adjusting features 1428 in combination with the greater distance between the first signal pad region 1414*a* and the base layer 1402 may also be designed to reduce the amount of coupling and thereby increase the impedance of the first signal pad region 1414*a* to better match the target channel impedance, thereby enabling time domain reflectometry (TDR) improvements. For example, better matching pad impedance to the channel impedance may help reduce channel return loss. Reducing channel return loss may improve signal integrity. Improving signal integrity may enable a higher bandwidth for the channel. Furthermore, improving signal integrity may help reduce system power consumption, e.g., by reducing signal/power transmitter swing and/or optimizing signal/power receiver equalization needs.

In various embodiments, the impedance adjusting feature 1428 may comprise (i) a void (e.g., an empty space) and/or (ii) a cavity that is at least partially filled with an insulating material (e.g., epoxy). In various embodiments, the impedance adjusting feature 1428 may be positioned along an axis that intersects with the signal trace interconnect portion 1422 whose impedance is being adjusted using the impedance adjusting feature 1428. For example, the impedance adjusting feature 1428 may be located within a space underneath a given electrical signal pad 1414. While FIG. 14 indicates the presence of a single impedance adjusting feature 1428, it should be appreciated that multiple discrete impedance adjusting features 1428 may be included below the first signal pad region 1414*a*.

In some embodiments, the impedance adjusting feature(s) 1428 may be offset from a center of the first signal pad region 1414*a*, e.g., as indicated in FIG. 14. In some embodiments, the impedance adjusting feature(s) 1428 may be centered with the first signal pad region 1414*a*. Characteristics of the impedance adjusting feature(s) 1428, such as, but not limited to, size (e.g., depth and/or width), position, location, shape, material, amount of fill, etc., may be determined based at least in part on a predetermined target impedance (for the signal pad region(s) 1414) that the impedance adjusting feature(s) 628 are designed to achieve, e.g., to match the signal channel impedance requirements, and/or to adjust the impedance of the electrical signal pad(s) to within a threshold impedance value proximity to the signal channel impedance.

In some embodiments, the impedance adjusting feature(s) 1428 may comprise a slot formed using one or more subtractive manufacturing processes (e.g., etching and/or lithography, etc.). The slot may have a depth, in the direction orthogonal to the image plane, that extends through at least a portion of the electrical grounding portion/reference plane 1418. That is, at least a portion of the electrical grounding portion/reference plane 1418 may define the impedance adjusting feature(s) 1428. In some embodiments, the depth of the slot may extend through a portion of the first conductive layer 1404 or through the whole depth of the first conductive layer 1404 without extending into the base layer 1402. In some embodiments, the depth of the slot may extend through the first conductive layer 1404 and a portion of the base layer 1402. In some embodiments, the depth of the slot may extend through the first conductive layer 1404 and through the whole depth of the base layer 1404. In some embodiments, e.g., where the first conductive layer 1404 is not present, the depth of the slot may extend through a portion of the base layer 1418 or through the whole depth of the base layer 1418.

According to some embodiments, the slot may have a width, in a direction parallel to the image plane, that extends a portion of the width of the first signal pad region 1414*a* or that extends the whole width of the first signal pad region 1414*a*. In various embodiments, the slot may have an outermost periphery, in the direction parallel to the image plane, that is smaller than or equal to the outermost periphery of the first signal pad region 1414*a*. Furthermore, the outermost periphery of the slot may be constrained to a position within the outermost periphery of the first signal pad region 1414*a*, e.g., if both outermost peripheries were projected onto the image plane.

Characteristics of the impedance adjusting feature 1428, such as, but not limited to, size (e.g., depth and/or width), position, location, shape, material, amount of fill, etc., may be determined based at least in part on a predetermined target impedance (for the electrical signal pad(s) 1414) that the impedance adjusting feature 1428 is designed to achieve, e.g., to match the signal channel impedance requirements, and/or to adjust the impedance of the electrical signal pad(s) to within a threshold impedance value proximity to the signal channel impedance. It should be understood that while the impedance adjusting feature 1428 may be positioned beneath the first signal pad region 1414*a*, additionally, or alternatively, one or more additional impedance adjusting features may be positioned beneath the first signal pad region 1414*a* and/or the second signal pad region 1414*b* and may include one or more same or similar features as described herein with respect to the impedance adjusting feature 1428. Each of the alternative or additional impedance adjusting features may be individually custom to adjust an impedance at the respective signal pad region to match an impedance at one or more associated signal traces.

Figure 15:
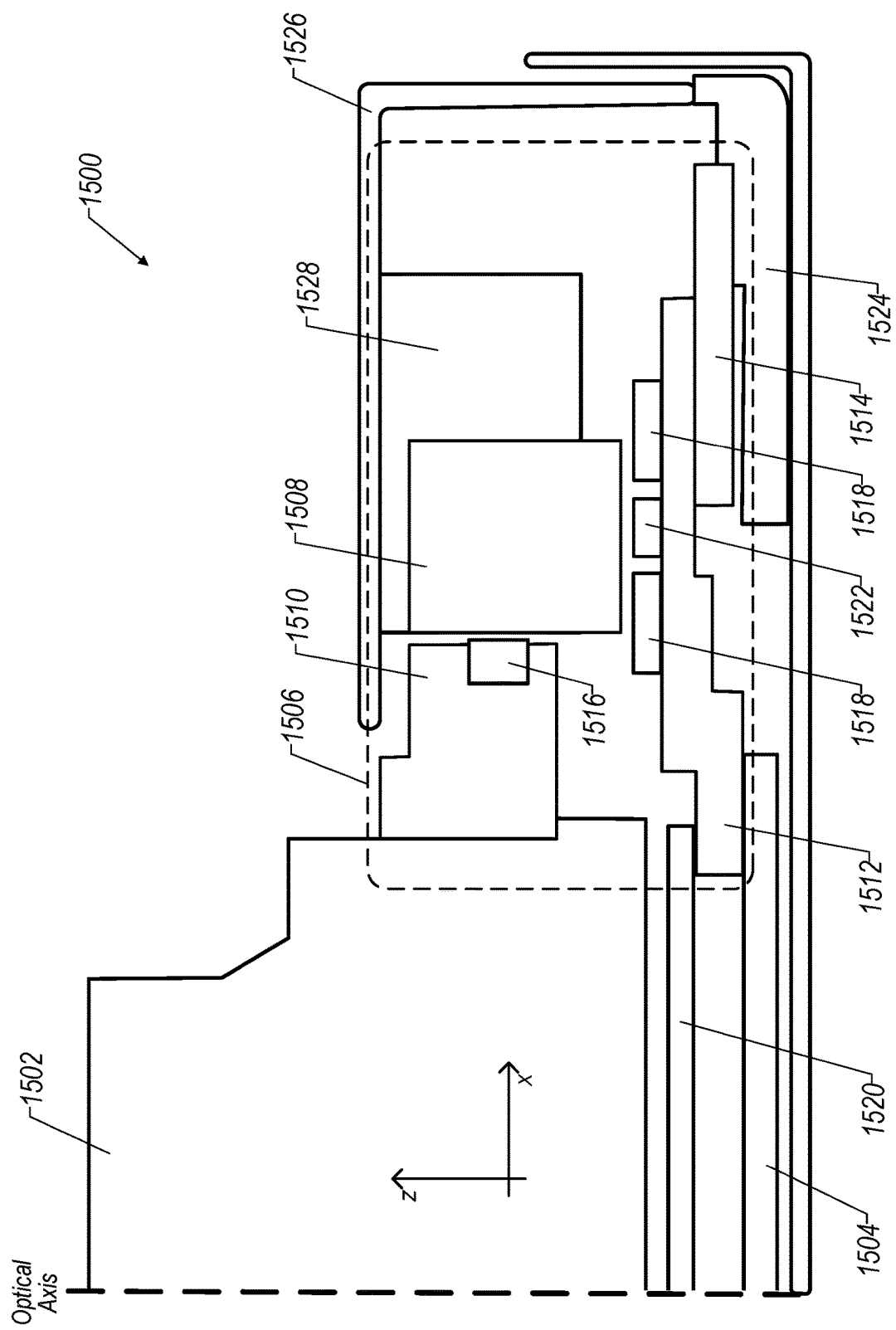
FIG. 15 illustrates a schematic cross-sectional side view of a portion of an example camera that may include one or more actuators and a sensor shift flexure arrangement for improved signal routing according to some aspects.

FIG. 15 illustrates a schematic cross-sectional side view of a portion of an example camera 1500 that may include one or more actuators and a sensor shift flexure arrangement for improved signal routing, in accordance with some embodiments. In some embodiments, camera 1500 may include a lens group 1502, an image sensor 1504, and a voice coil motor (VCM) actuator module 1506. The lens group 1502 may define an optical axis. The image sensor 1504 may be configured to capture light passing through the lens group 1502 and convert the captured light into image signals. In some cases, the VCM actuator module 1506 may be one of multiple VCM actuator modules of the camera 1500. For instance, the camera 1500 may include four such VCM actuator modules 1506, such as two pairs of VCM actuator modules 1506 that oppose one another relative to the lens group 1502. The VCM actuator modules 1506 may be configured to move the lens group 1502 along the optical axis (e.g., in the Z-axis direction, to provide autofocus (AF) functionality) and/or tilt the lens group 1502 relative to the optical axis. Furthermore, the VCM actuator module(s) 1506 may be configured to move the image sensor 1504 in directions orthogonal to the optical axis (e.g., in the X-axis and/or Y-axis directions, to provide optical image stabilization (OIS) functionality).

In various embodiments, the VCM actuator module 1506 may include a magnet 1508 (e.g., a stationary single pole magnet), a lens holder 1510, a substrate 1512, a top flexure (not shown), and a bottom flexure 1514 (e.g., comprising one or more sensor shift flexure arrangements disclosed herein). In various embodiments, the bottom flexure 1514 may be the same as, or similar to, flexure 106 in FIGS. 1-2, flexure 302 in FIG. 3A, and/or flexure-circuit hybrid structure 308 in FIG. 3B. Furthermore, the VCM actuator module 1506 may include an AF coil 1516 and a bottom sensor positioning (SP) coil 1518.

In some embodiments, the lens holder 1510 may hold, or otherwise support, the AF coil 1516 proximate a side of the magnet 1508. The lens holder 1510 may be coupled to the lens group 1502 such that the lens group 1502 shifts together with the lens holder 1510.

In various embodiments, the substrate 1512 may hold, or otherwise support, the bottom SP coil 1518 proximate a bottom side of the magnet 1508. The substrate 1512 may be coupled to the image sensor 1504 such that the image sensor 1504 shifts together with the substrate 1512. In some embodiments, the substrate 1512 may also be coupled with, or may otherwise support, an infrared cut-off filter (IRCF) 1520 (and/or one or more other optical elements), e.g., as indicated in FIG. 15.

In some embodiments, the VCM actuator module 1506 may include a position sensor 1522 (e.g., a Hall sensor) for position detection based on movement of the SP coil 1518 in directions orthogonal to the optical axis. For example, the position sensor 1522 may be located on the substrate 1512 proximate to the SP coil 1518.

The flexure 1514 may be configured to provide compliance for motion of the substrate 1512 in directions orthogonal to the optical axis. Furthermore, the flexure 1514 may be configured to suspend the substrate 1512 and the image sensor 1504 from one or more stationary structures 1524 of the camera 1500.

The top flexure (not shown) may be configured to mechanically and electrically connect the lens holder 1510 to the shield can 1526 and/or to one or more other stationary structures (e.g., stationary structure 1524). The top flexure may be configured to provide compliance for movement of the lens holder 1510 along the optical axis and for tilt of the lens holder 1510 relative to the optical axis. The shield can 1526 may encase, at least in part, an interior of the camera 1500. The shield can 1526 may be a stationary component that is static relative to one or more moving components (e.g., the lens holder 1510 and substrate 1512).

In some embodiments, the stationary magnet 1508 may be fixed to a stationary structure (e.g., magnet holder 1528). In some examples, each of the AF coil 1516 and the SP coil 1518 may be a race track coil.

Electromagnetic interaction between the AF coil 1516 and the magnet 1508 may produce Lorentz forces that cause the lens holder 1510 to move along the optical axis and/or to tilt relative to the optical axis. Electromagnetic interaction between the SP coil 1518 and the magnet 1508 may produce Lorentz forces that cause the substrate 1512 to move in directions orthogonal to the optical axis. The lens group 1502 may shift together with (e.g., in lockstep with) the lens holder 1510. Furthermore, the image sensor 1504 may shift together with (e.g., in lockstep with) the substrate 1512.

As discussed herein, electrical contacts/connections may allow for electrical signals (e.g., image signals) to be conveyed from the image sensor 1504 to a controller (not shown). For instance, the image sensor 1504 may be in electrical contact with the substrate 1512 via one or more contacts, and thus image signals may be conveyed from the image sensor 1504 to the substrate 1512. The image signals may be conveyed from the substrate 1512 to one or more external components (e.g., external component(s) 314 in FIGS. 3A-3B) via the flexure 1514 and a flex circuit (e.g., flex circuit 108 in FIG. 1, flex circuit 304 in FIG. 3A, etc.). According to various examples, electrical contacts/connections may allow for current to be conveyed from the controller to the substrate 1512 to drive the SP coil 1518.

Figure 16:
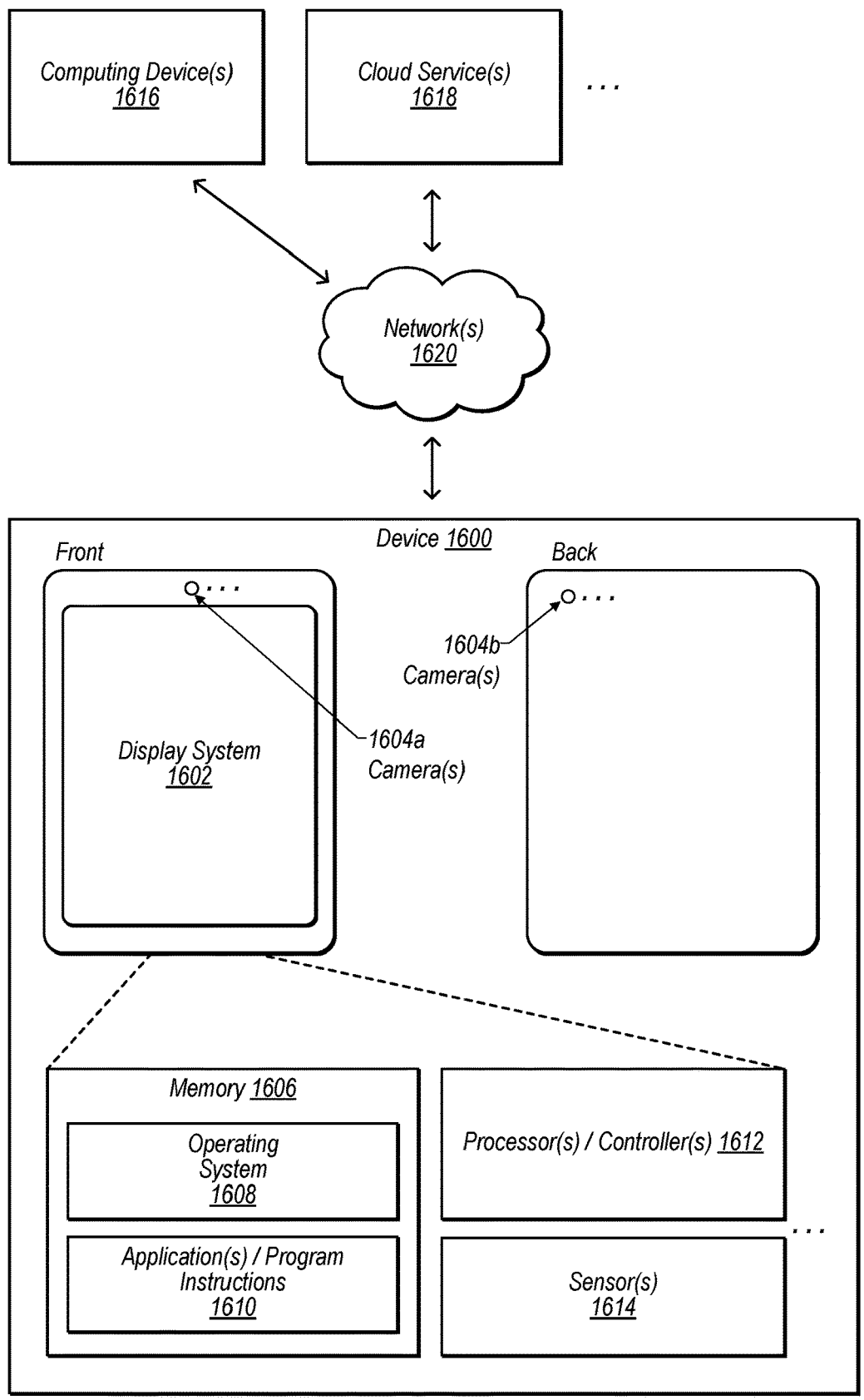
FIG. 16 illustrates a schematic representation of an example device that may include a camera with a sensor shift flexure arrangement for improved signal routing according to some aspects.

FIG. 16 illustrates a schematic representation of an example device 1600 that may include one or more cameras. For example, the device 1600 may include a camera system having a sensor shift flexure arrangement for improved signal routing, such as the camera systems and sensor shift flexure arrangement described herein with reference to FIGS. 1-7. In some embodiments, the device 1600 may be a mobile device and/or a multifunction device. In various embodiments, the device 1600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1600 may include a display system 1602 (e.g., comprising a display and/or a touch-sensitive surface) and/or one or more cameras 1604. In some non-limiting embodiments, the display system 1602 and/or one or more front-facing cameras 1604a may be provided at a front side of the device 1600, e.g., as indicated in FIG. 16. Additionally, or alternatively, one or more rear-facing cameras 1604b may be provided at a rear side of the device 1600. In some embodiments comprising multiple cameras 1604, some or all of the cameras 1604 may be the same as, or similar to, each other. Additionally, or alternatively, some or all of the cameras 1604 may be different from each other. In various embodiments, the location(s) and/or arrangement(s) of the camera(s) 1604 may be different than those indicated in FIG. 16.

Among other things, the device 1600 may include memory 1606 (e.g., comprising an operating system 1608 and/or application(s)/program instructions 1610), one or more processors and/or controllers 1612 (e.g., comprising CPU(s), memory controller(s), display controller(s), and/or camera controller(s), etc.), and/or one or more sensors 1614 (e.g., orientation sensor(s), proximity sensor(s), and/or position sensor(s), etc.). In some embodiments, the device 1600 may communicate with one or more other devices and/or services, such as computing device(s) 1616, cloud service(s) 1618, etc., via one or more networks 1620. For example, the device 1600 may include a network interface (e.g., network interface 910 in FIG. 9) that enables the device 1600 to transmit data to, and receive data from, the network(s) 1620. Additionally, or alternatively, the device 1600 may be capable of communicating with other devices via wireless communication using any of a variety of communications standards, protocols, and/or technologies.

Figure 17:
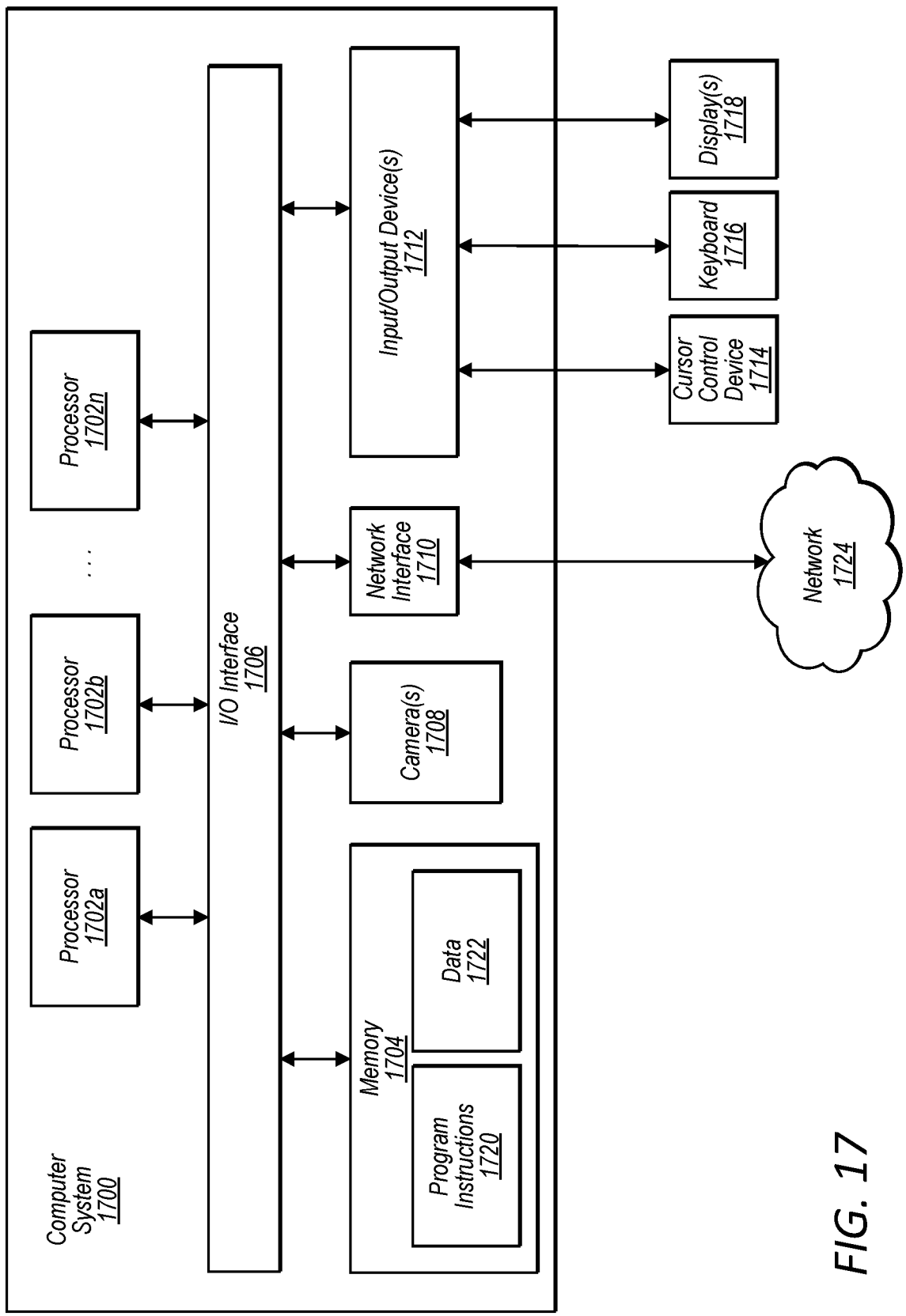
FIG. 17 illustrates a schematic block diagram of an example computer system that may include a camera with a sensor shift flexure arrangement for improved signal routing according to some aspects.

FIG. 17 illustrates a schematic block diagram of an example computer system 1700 that may include a camera having a sensor shift flexure arrangement for improved signal routing, e.g., as described herein with reference to FIGS. 1-14. In addition, computer system 1700 may implement methods for controlling operations of the camera and/or for performing image processing on images captured with the camera. In some embodiments, the device 1600 (described herein with reference to FIG. 16) may additionally, or alternatively, include some or all of the functional components of the described herein.

The computer system 1700 may be configured to execute any or all of the embodiments described above. In different embodiments, computer system 1700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1700 includes one or more processors 1702 coupled to a system memory 1704 via an input/output (I/O) interface 1706. Computer system 1700 further includes one or more cameras 1708 coupled to the I/O interface 1706. Computer system 1700 further includes a network interface 1710 coupled to I/O interface 1706, and one or more input/output devices 1712, such as cursor control device 1714, keyboard 1716, and display(s) 1718. In some cases, it is contemplated that embodiments may be implemented using a single instance of computer system 1700, while in other embodiments multiple such systems, or multiple nodes making up computer system 1700, may be configured to host different portions or instances of embodiments. For example, in one embodiment some elements may be implemented via one or more nodes of computer system 1700 that are distinct from those nodes implementing other elements.

In various embodiments, computer system 1700 may be a uniprocessor system including one processor 1702, or a multiprocessor system including several processors 1702 (e.g., two, four, eight, or another suitable number). Processors 1702 may be any suitable processor capable of executing instructions. For example, in various embodiments processors 1702 may be general-purpose or embedded processors implementing any of a variety of instruction set architectures (ISAs), such as the x86, PowerPC, SPARC, or MIPS ISAs, or any other suitable ISA. In multiprocessor systems, each of processors 1702 may commonly, but not necessarily, implement the same ISA.

System memory 1704 may be configured to store program instructions 1720 accessible by processor 1702. In various embodiments, system memory 1704 may be implemented using any suitable memory technology, such as static random access memory (SRAM), synchronous dynamic RAM (SDRAM), nonvolatile/Flash-type memory, or any other type of memory. Additionally, existing camera control data 1722 of memory 1704 may include any of the information or data structures described above. In some embodiments, program instructions 1720 and/or data 1722 may be received, sent or stored upon different types of computer-accessible media or on similar media separate from system memory 1704 or computer system 1700. In various embodiments, some or all of the functionality described herein may be implemented via such a computer system 1700.

In one embodiment, I/O interface 1706 may be configured to coordinate I/O traffic between processor 1702, system memory 1704, and any peripheral devices in the device, including network interface 1710 or other peripheral interfaces, such as input/output devices 1712. In some embodiments, I/O interface 1706 may perform any necessary protocol, timing or other data transformations to convert data signals from one component (e.g., system memory 1704 into a format suitable for use by another component (e.g., processor 1702). In some embodiments, I/O interface 1706 may include support for devices attached through various types of peripheral buses, such as a variant of the Peripheral Component Interconnect (PCI) bus standard or the Universal Serial Bus (USB) standard, for example. In some embodiments, the function of I/O interface 1706 may be split into two or more separate components, such as a north bridge and a south bridge, for example. Also, in some embodiments some or all of the functionality of I/O interface 1706, such as an interface to system memory 1704, may be incorporated directly into processors 1702.

Network interface 1710 may be configured to allow data to be exchanged between computer system 1700 and other devices attached to a network 1724 (e.g., carrier or agent devices) or between nodes of computer system 1700. Network 1724 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1710 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output device(s) 1712 may, in some embodiments, include one or more display terminals, keyboards, keypads, touchpads, scanning devices, voice or optical recognition devices, or any other devices suitable for entering or accessing data by one or more computer systems 1700. Multiple input/output devices 1712 may be present in computer system 1700 or may be distributed on various nodes of computer system 1700. In some embodiments, similar input/output devices may be separate from computer system 1700 and may interact with one or more nodes of computer system 1700 through a wired or wireless connection, such as over network interface 1710.

Those skilled in the art will appreciate that computer system 1700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1700 may be transmitted to computer system 1700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
   a lens group;
   an image sensor;
   an actuator to move the image sensor relative to the lens group; and
   a flexure that suspends the image sensor from a stationary structure of the camera and that allows motion of the image sensor enabled by the actuator, the flexure comprising:
   a plurality of layers stacked in a direction orthogonal to an image plane defined by the image sensor, the plurality of layers comprising:
   a conductive layer comprising a signal pad region and a signal trace region, and
   a conductive ground layer, wherein a distance between at least one section of the signal pad region and the conductive ground layer is greater than a distance between at least a section of the signal trace region and the conductive ground layer.

2. The camera of claim 1, wherein the at least one section of the signal trace region comprises an entire area of the signal trace region.

3. The camera of claim 1, wherein the at least one section of the signal pad region comprises an entire area of the signal pad region.

4. The camera of claim 1, wherein the at least one section of the signal pad region is occupied by a signal pad coupled to an electrical trace for communicating one or more electrical signals.

5. The camera of claim 1, wherein the at least one section of the signal pad region excludes a section occupied by a power pad coupled to an electrical trace for communicating power.

6. The camera of claim 1, wherein the signal pad region is located on an outer perimeter of the flexure.

7. The camera of claim 1, wherein the signal pad region is located on an inner perimeter of the flexure.

8. The camera of claim 1, wherein the at least one section of the signal pad region comprises a same impedance as the at least a section of the signal trace region.

9. The camera of claim 1, wherein the flexure further comprises an impedance adjusting feature comprising (i) a void or (ii) a cavity that is at least partially filled with an insulating material, and wherein the impedance adjusting feature is positioned beneath the at least one section of the signal pad region and the conductive ground layer.

10. The camera of claim 1, wherein the signal pad region comprises a signal pad and at least one of a power pad or a ground pad, and wherein the signal pad is smaller than at least one of the power pad or the ground pad.

11. A device, comprising:
    one or more processors;
    memory storing program instructions executable by the one or more processors to control operations of a camera; and
    the camera, comprising:

a lens group;

an image sensor;

an actuator to move the image sensor relative to the lens group; and a flexure that suspends the image sensor from a stationary structure of the camera and that allows motion of the image sensor enabled by the actuator, the flexure comprising:

a plurality of layers stacked in a direction orthogonal to an image plane defined by the image sensor, the plurality of layers comprising:

a conductive layer comprising a signal pad region and a signal trace region, and a conductive ground layer, wherein a distance between at least one section of the signal pad region and the conductive ground layer is greater than a distance between at least a section of the signal trace region and the conductive ground layer.

12. The device of claim 11, wherein the at least one section of the signal trace region comprises an entire area of the signal trace region.

13. The device of claim 11, wherein the at least one section of the signal pad region comprises an entire area of the signal pad region.

14. The device of claim 11, wherein the at least one section of the signal pad region is occupied by a signal pad coupled to an electrical trace for communicating one or more electrical signals.

15. The device of claim 11, wherein the at least one section of the signal pad region comprises a same impedance as the at least a section of the signal trace region.

16. The device of claim 11, wherein the flexure further comprises an impedance adjusting feature comprising (i) a void or (ii) a cavity that is at least partially filled with an insulating material, and wherein the impedance adjusting feature is positioned beneath the at least one section of the signal pad region and the conductive ground layer.

17. The device of claim 11, wherein the signal pad region comprises a signal pad and at least one of a power pad or a ground pad, and wherein the signal pad is smaller than at least one of the power pad or the ground pad.

18. A method for manufacturing a flexure, the method comprising:

coating a surface of a base layer of the flexure with a first coating;

exposing and curing an inner frame of the flexure after coating the surface of the base layer with the first coating; and coating the surface of the base layer and a surface of the first coating with a second coating.

19. The method for claim 18, further comprising:

exposing and curing an outer frame of the flexure after coating the surface of the base layer and the surface of the first coating with the second coating.

20. The method of claim 18, wherein at least one of the first coating or the second coating comprises polyimide (PI).

* * * * *